United States Patent
O'Connell et al.

(10) Patent No.: US 12,026,540 B2
(45) Date of Patent: Jul. 2, 2024

(54) WORKING MEMORY MANAGEMENT

(71) Applicant: Kyndryl, Inc., New York, NY (US)

(72) Inventors: Brian M. O'Connell, Wake/Cary, NC (US); Ann Corrao, Raleigh, NC (US); Samir Nasser, Durham, NC (US); Jeremy R. Fox, Georgetown, TX (US)

(73) Assignee: Kyndryl, Inc., New York, NY (US)

( * ) Notice: Subject to any disclaimer, the term of this patent is extended or adjusted under 35 U.S.C. 154(b) by 443 days.

(21) Appl. No.: 17/574,643

(22) Filed: Jan. 13, 2022

(65) Prior Publication Data

US 2023/0221986 A1  Jul. 13, 2023

(51) Int. Cl.
| | |
|---|---|
| *G06F 9/44* | (2018.01) |
| *G06F 3/06* | (2006.01) |
| *G06F 9/46* | (2006.01) |
| *G06N 5/02* | (2023.01) |

(52) U.S. Cl.
CPC ............ *G06F 9/467* (2013.01); *G06F 3/0673* (2013.01); *G06F 9/466* (2013.01); *G06N 5/02* (2013.01)

(58) Field of Classification Search
CPC ..................................................... G06F 9/467
USPC .......................................................... 718/1
See application file for complete search history.

(56) References Cited

U.S. PATENT DOCUMENTS

| | | | |
|---|---|---|---|
| 6,516,393 B1 | 2/2003 | Fee et al. | |
| 7,120,706 B2 | 10/2006 | Zievers | |
| 8,402,464 B2 | 3/2013 | Dice et al. | |
| 8,583,783 B1 * | 11/2013 | Hayward | G06F 12/0253 |
| | | | 709/224 |
| 9,170,844 B2 | 10/2015 | Blainey et al. | |
| 9,268,542 B1 | 2/2016 | Mars et al. | |
| 10,204,175 B2 * | 2/2019 | Hu | G06F 16/9024 |
| 10,831,607 B2 | 11/2020 | Williams et al. | |

(Continued)

FOREIGN PATENT DOCUMENTS

KR       101772921 B1    8/2017

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Timothy A Mudrick
(74) *Attorney, Agent, or Firm* — CANTOR COLBURN LLP; Dan Housley

(57) ABSTRACT

Methods, computer program products, and systems are presented. The method computer program products, and systems can include, for instance: predicting, with use of one or more predictive model, subsequent future state data of a computing node having an associated working memory, wherein the subsequent future state data specifies that a certain transaction currently uninvoked will be invoked by the computing node; prior to the invoking of the certain transaction, proactively establishing one or more control parameter value for controlling the working memory in dependence on the future state data; invoking the certain transaction in response to receipt, by the computing node, of transaction invoking request data for invoking the certain transaction; and executing the certain transaction in dependence on at least one control parameter value of the one or more control parameter value for controlling the working memory.

20 Claims, 11 Drawing Sheets

(56) References Cited

U.S. PATENT DOCUMENTS

2015/0154045 A1 6/2015 Blake et al.
2022/0413920 A1* 12/2022 Nizar .................... G06F 9/5038

OTHER PUBLICATIONS

"Memory PLUS: A Beautiful Memory Utility", http://www.solutionshare.net/macos/memory-plus/memory-plus.html (2 pages) (Year: 2021).
"Amazng Apps for MAC", http://www.rockysandstudio.com (2 pages) (Year: 2021).

* cited by examiner

WORKING MEMORY MANAGEMENT

BACKGROUND

Embodiments herein relate generally to memory management and specifically to working memory management.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: predicting, with use of one or more predictive model, subsequent future state data of a computing node having an associated working memory, wherein the subsequent future state data specifies that a certain transaction currently uninvoked will be invoked by the computing node; prior to the invoking of the certain transaction, proactively establishing one or more control parameter value for controlling the working memory in dependence on the future state data; invoking the certain transaction in response to receipt by the computing node of transaction invoking request data for invoking the certain transaction; and executing the certain transaction in dependence on at least one control parameter value of the one or more control parameter value for controlling the working memory.

In another aspect, a computer program product can be provided. The computer program product can include a computer readable storage medium readable by one or more processing circuit and storing instructions for execution by one or more processor for performing a method. The method can include, for example: predicting, with use of one or more predictive model, subsequent future state data of a computing node having an associated working memory, wherein the subsequent future state data specifies that a certain transaction currently uninvoked will be invoked by the computing node; prior to the invoking of the certain transaction, proactively establishing one or more control parameter value for controlling the working memory in dependence on the future state data; invoking the certain transaction in response to receipt by the computing node of transaction invoking request data for invoking the certain transaction; and executing the certain transaction in dependence on at least one control parameter value of the one or more control parameter value for controlling the working memory.

In a further aspect, a system can be provided. The system can include, for example a memory. In addition, the system can include one or more processor in communication with the memory. Further, the system can include program instructions executable by the one or more processor via the memory to perform a method. The method can include, for example: predicting, with use of one or more predictive model, subsequent future state data of a computing node having an associated working memory, wherein the subsequent future state data specifies that a certain transaction currently uninvoked will be invoked by the computing node; prior to the invoking of the certain transaction, proactively establishing one or more control parameter value for controlling the working memory in dependence on the future state data; invoking the certain transaction in response to receipt by the computing node of transaction invoking request data for invoking the certain transaction; and executing the certain transaction in dependence on at least one control parameter value of the one or more control parameter value for controlling the working memory.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
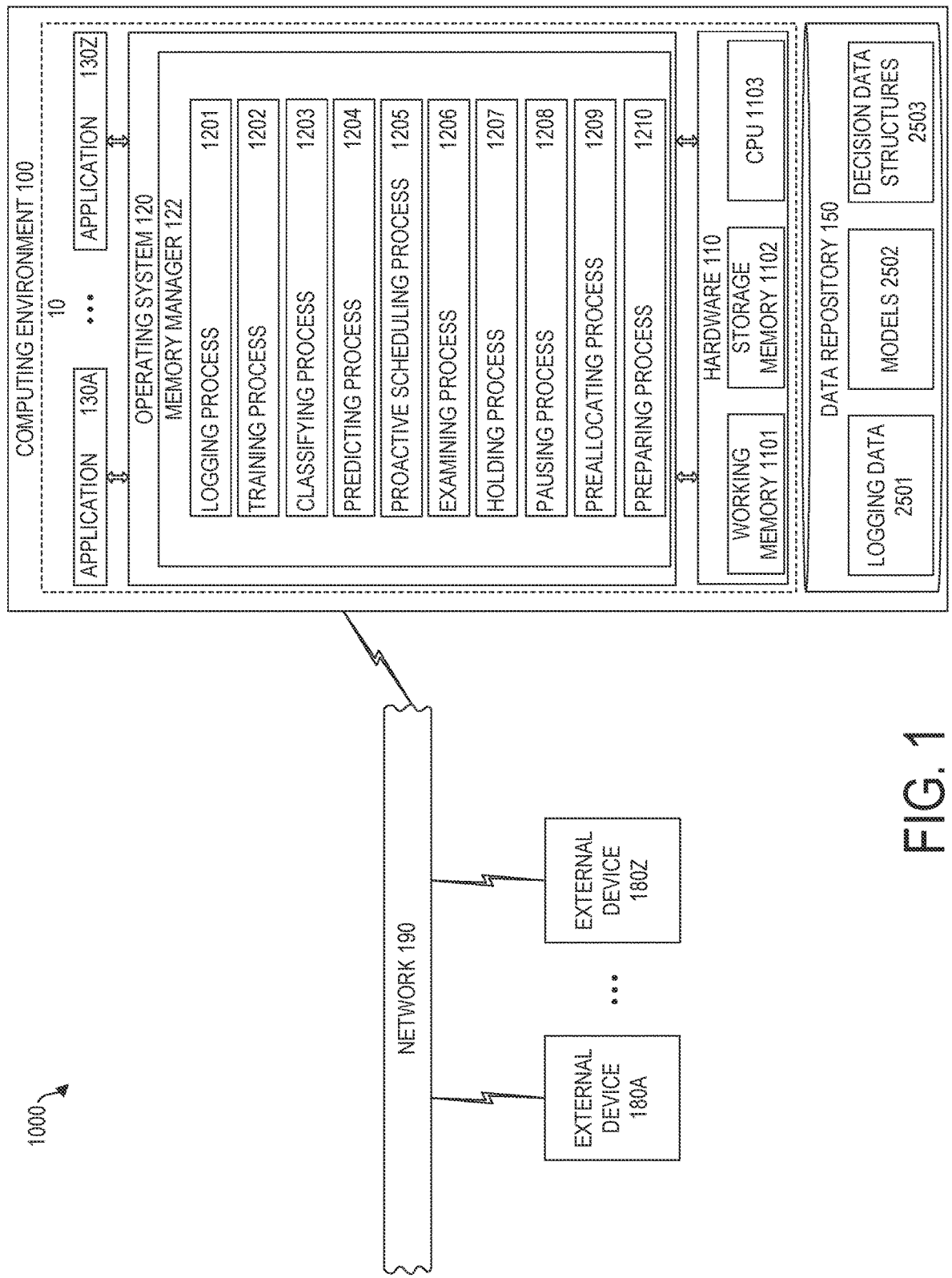
FIG. 1 illustrates a system having a computing environment in communication with a plurality of external devices, according to one embodiment.

System 1000 for use in performance of proactive memory management is illustrated in FIG. 1. System 1000 can include computing environment 100 having at least one computing node 10, which can include an associated data repository 150 and a plurality of external devices 180A-180Z which can be in communication with one another via network 190. Network 190 can be a physical network and/or virtual network. A physical network can be, for example, a physical telecommunications network connecting numerous computing systems, such as computer servers and computer clients. A virtual network can, for example, combine numerous physical networks or parts thereof into a logical virtual network. In another example, numerous virtual networks can be defined over a single physical network.

External devices 180A-180Z can be associated, e.g., to users such as customer end users and/or agent users associated to enterprises. External devices of external devices 180A-180Z can also or alternatively include, e.g., enterprise systems. External devices 180A-180Z can generate request data, e.g., transaction invoking request data, which transaction invoking request data can invoke a transaction on receipt by computing environment 100.

Embodiments herein recognize that existing approaches for memory management with respect to a computing node are sometimes characterized by wasteful and costly operations. In some use cases, memory exhaustion can occur causing "page-out" of transaction data from working memory into storage memory. When page-out occurs, recovery of the storage memory-stored transaction data from storage memory back into working memory may be required for completion of transaction processing. Among other advantages, embodiments herein, e.g., by proactive memory management configuring and transaction scheduling, can avoid instances of memory exhaustion and can provide for efficient execution of multiple concurrent transactions. Embodiments herein can include an operating system memory manager that predictively and proactively establishes a set of memory management configuration parameter values.

In one aspect, the memory management configuration parameter values can include a parameter value to proactively and predictively reserve memory space in working memory 1101 to facilitate execution of a transaction which has not yet arrived at a computing node. Arrival of a transaction can occur, e.g., when transaction invoking request data associated to a transaction is received by a computing node.

Referring to FIG. 1, computing environment 100 can include at least one computing node 10. Computing node 10 can include multiple layers. Referring to FIG. 1, computing node 10 can include a physical layer including hardware 110, e.g., which can include working memory 1101, storage memory 1102, and central processing unit (CPU) 1103. Working memory 1101, in one embodiment, can be provided by a volatile random access memory (RAM) device. Storage memory 1102 can be provided by a non-volatile memory device.

Computing node 10 can further include an operating system layer which can include operating system (OS) 120 having memory manager 122. Memory manager 122 can run various processes, including logging process 1201, training process 1202, classifying process 1203, predicting process 1204, proactive scheduling process 1205, examining process 1206, holding process 1207, pausing process 1208, pre-allocating process 1209, and preparing process 1210.

Memory manager 122 running logging process 1201 can include memory manager 122 iteratively logging actions and states associated to working memory 1101 into logging data area 2501 of data repository 150. Logging data can include, e.g., start times of transactions, end times of transactions, memory space utilization of transactions, memory addresses of transactions, and the like. Memory manager 122 running logging process can employ various logging utilities such as, e.g., Windows PERFORMANCE MONITOR™, available from Microsoft, Inc. of Redmond, Washington, CACTI™ system monitoring developed by the Cacti Group, Inc., and NAGIOS™ system monitoring published by the Free Software Foundation. Tools that can be used by operating system 120 for the return of logging data can also, or alternatively include, e.g., STRACE™ and FTRACE™. STRACE™ is a diagnostic debugging and instructional user space utility for Linux. It can be used to monitor and tamper with interactions between processes in Linux kernel which include system calls, signal deliveries, and changes of process state. FTRACE™ is a tracing framework for the Linux kernel. With use of the FTRACE™ utility, record information related to various function calls performed while a kernel is running can be traced. Operating system 120 can be configured to iteratively store additional logging data into logging data area 2501, e.g., system call data received by operating system 120 from running applications and request data received from external devices 180A-180Z, which request data can invoke system calls.

Memory manager 122 running training process 1202 can include memory manager 122 training predictive models for use in returning predictions that can be used by memory manager 122 in establishing memory management configuration parameter values.

Memory manager 122 running training process 1202 can include memory manager 122 training one or more predictive model. Memory manager 122 running training process 1202 can include memory manager 122 applying logging data defining transaction characterizing parameter values as training data for training such respective predictive models.

Memory manager 122 running classifying process 1203 can include memory manager 122 classifying incoming transaction data as belonging to a prior performed and recognized transaction. Memory manager 122 running classifying process 1203 can include memory manager 122 analyzing transaction invoking request data sent by one or more external device of external devices 180A-180Z.

Memory manager 122 running predicting process 1204 can include memory manager predicting subsequent working memory characterizing parameter values characterizing a state of working memory 1101. Memory manager 122 running predicting process 1204 can include memory manager 122 querying predictive models trained by memory manager 122 running training process 1202.

Memory manager running proactive scheduling process 1205 can include memory manager 122 proactively scheduling execution of a transaction not yet received by computing node 10.

Memory manager 122 running examining process 1206 can include memory manager 122 examining parameter values characterizing attributes of working memory 1101 for use in establishing memory management control configuration parameter values.

Memory manager 122 running holding process 1201 can include memory manager 122, e.g., maintaining transaction data defining a transaction in a job queue prior to committing a transaction to a run queue in which memory space of working memory 1101 is committed and allocated to an identified transaction.

Memory manager 122 running pausing process 1208 can include memory manager 122 pausing one or more identified concurrent transactions that are predicted to be concurrently running and consuming memory space within working memory 1101. Memory manager 122 running pausing process 1208 can pause one or more running concurrent transaction, e.g., to permit a higher priority transaction to execute.

Memory manager 122 running pre-allocating process 1209 can pre-allocate memory space within working memory 1101 to a transaction. Memory manager 122 running preparing process 1210 can include memory manager 122 running various preparation processes to prepare memory space address locations of working memory 1101 to facilitate execution of a transaction predicted to arrive at computing node 10, which has not yet arrived at computing node 10. Memory manager 122 running preparing process 1210 can include memory manager 122 performing, e.g., memory cleaning processes in a memory defragmentation process.

Computing node 10 can also include an application layer defined by one or more application of applications 130A-130Z running on operating system 120. Applications 130A-130Z can include, e.g., customer service and user applications such as customer service applications including banking applications, online item acquisition processing, social networking applications, and the like. While operating system 120 in FIG. 1 is depicted as running on hardware 110, operating system 120, in another embodiment, can run, e.g., on a hypervisor to define a guest operating system.

In a further aspect, computing environment 100 can include data repository 150. Data repository 150 can be associated to operating system 120 and memory manager 122. Data repository 150 can include logging data area 2501 for storing logging data. Logging data can include historical data that specifies states of working memory 1101 over time. Logging data stored in logging data area 1501 can include timestamp data. Each timestamp can tag such data as transaction IDs specifying transactions running and consuming memory space of working memory 1101 at the time of the timestamp.

Data repository 150 in models area 1502 can include, e.g., an iteratively trained predictive model for each transaction that has been executed by computing node 10. Memory manager 122 can be configured so that when a new transaction is identified, memory manager 122 can store in models area 1502 a predictive model for the transaction. Memory manager 122 can train the predictive model and query the predictive model for return of predictions respecting the identified transaction.

Data repository 150 in decision data structures area 2503 can include, e.g., decision trees and/or decision trails or other decision data structures for return of action decisions by computing node 10.

Figure 2:
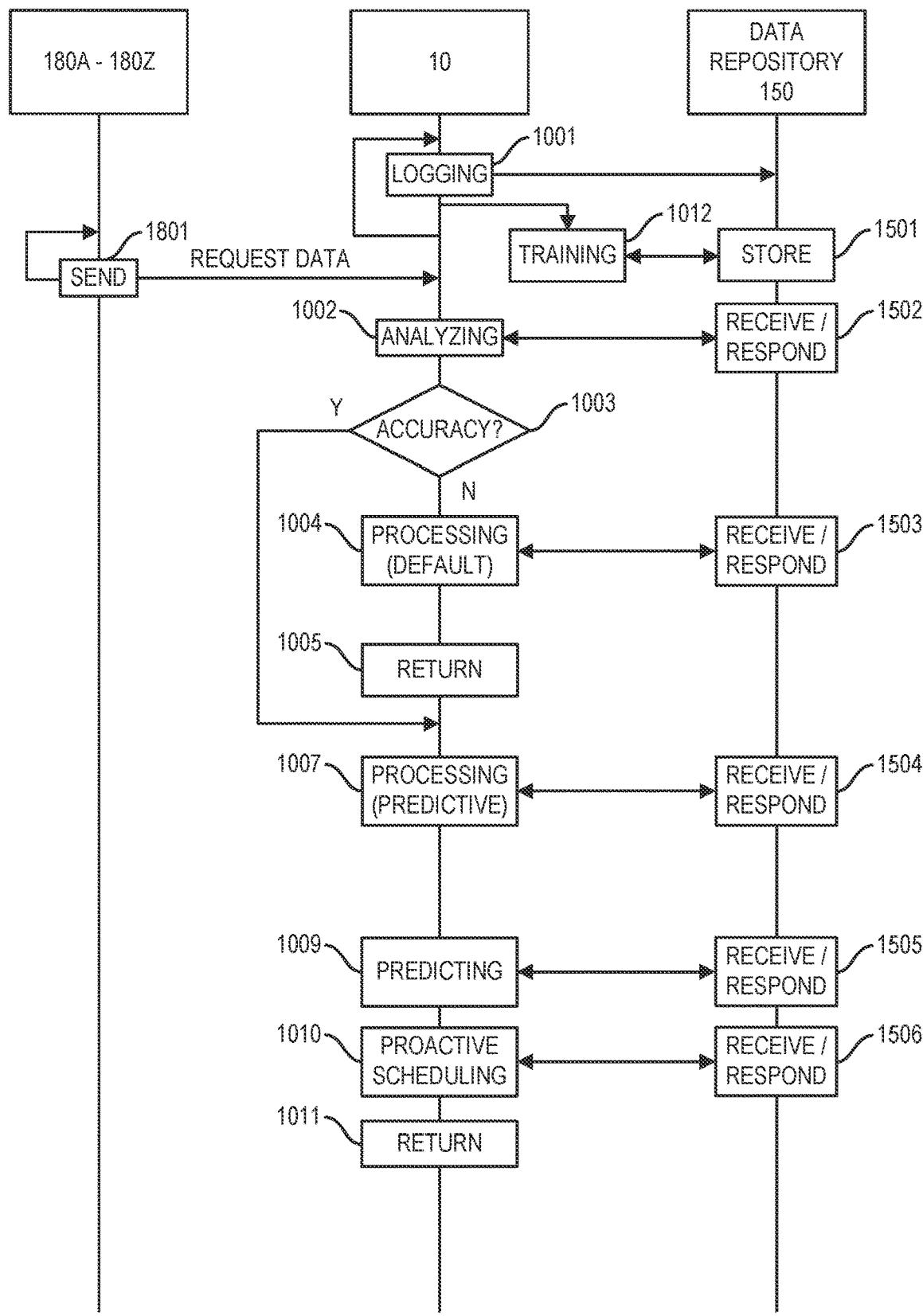
FIG. 2 is a flowchart illustrating performance of a computing node interoperating with a plurality of external devices, according to one embodiment.

A method for performance by computing node 10 having an associated data repository 150 and external computing devices 180A-180Z is set forth in reference to the flowchart of FIG. 2.

At block 1001, computing node 10 by operating system 120 can be logging state data specifying the state of working memory 1101. State data can include a plurality of parameter values that characterize the current state of working memory 1101. The parameter values can specify, e.g., identifiers for transactions that are currently running and consuming memory space of working memory 1101, start times associated to the described transactions, termination times associated to the described transactions, execution time duration parameter values for the running transactions, and memory utilization parameter values for the running transactions. As indicated by logging block 1001, the logging at block 1001 can be iterative. The logging depicted at logging block 1001 can be iteratively performed throughout a deployment period of computing node 10. With the iterated performance of logging block 1001, logging data can be iteratively sent by operating system 120 into data repository 150 for storage into logging data area 1501 by data repository 150 at store block 1501. Thus, logging data area 2501 of data repository 150 defines a history of repository state data specifying the state of working memory 1101 over time. As set forth herein, memory manager 122 can utilize history data of logging data area 1501 in order to, e.g., proactively establish memory management configuration parameter values for proactive control of working memory 1101 to facilitate coordination between transactions, including predicted transactions that have not yet been invoked but which are expected to be invoked by operating system 120 and memory manager 122. Operating system 120 can be configured to iteratively store additional logging data into logging data area 2501 at logging block 1001, e.g., system call data received by operating system 120 from running applications and request data received from external devices 180A-180Z, which request data can invoke system calls, and computing node state data, e.g., parameter values specifying transactions invoked but not committed to working memory 1101.

Figure 3A:
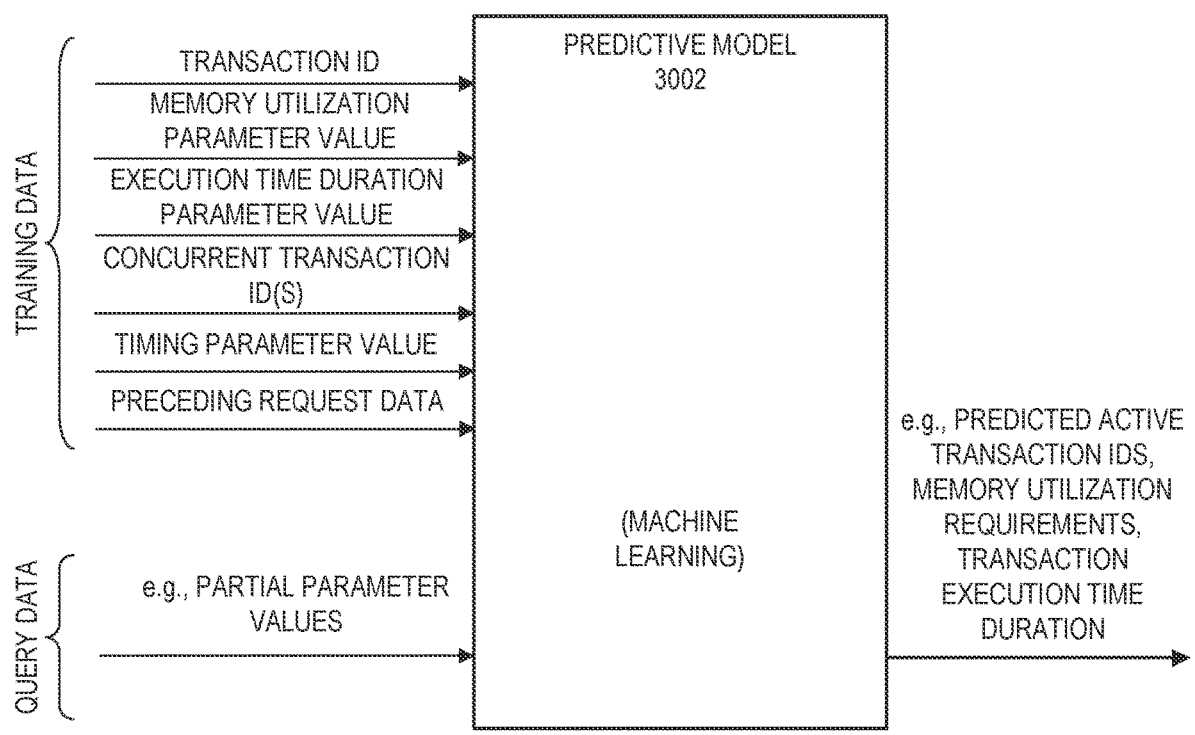
FIG. 3A depicts a predictive model for predicting a future subsequent time for predicting the future state of working memory, according to one embodiment.
Figure 3B:
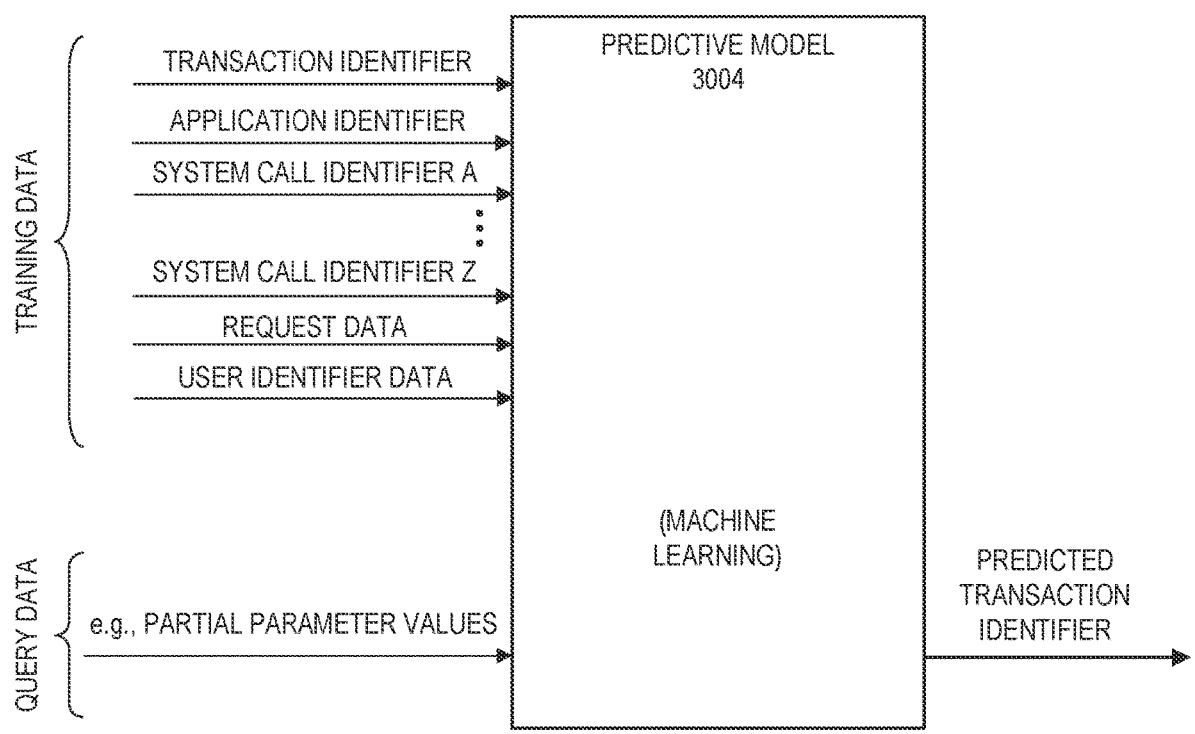
FIG. 3B depicts a predictive model for use in classifying an invoked transaction invoked by request data and/or system calls, according to one embodiment.

On completion of logging at block 1001, memory manager 122 can proceed to block 1012 to perform training of instances of predictive model 3002 as shown in FIG. 3A and predictive model 3004 as shown in FIG. 3B.

For support of operations herein, there can be associated to computing node 10 a plurality of instances of predictive model 3002, one instance for each detected transaction expected to be performed by computing node 10. Predictive model 3002 can be trained with training data so that predictive model 3002 is able to predict, for a next time period, a set of transactions that will have been invoked for operation by computing node 10 as well as memory utilization requirements associated to such transactions predicted to be active when invoked. Predictive model 3002 can be iteratively trained with training datasets, and once trained, can be configured to be responsive to query data. A training dataset can comprise a set of data associated to a transaction having been completed by CPU 1103 with use of working memory 1101. Memory manager 122 can be configured to iteratively perform the loop of blocks 1001 and 1002 during a deployment period of computing node 10. A training dataset for training predictive model 3002 can include, (a) a transaction ID identifier that identifies the transaction that was executed; (b) a memory utilization parameter value that specifies the amount of memory that was utilized for performance of the transaction; (c) an execution time duration parameter value that specifies an elapsed execution time duration of a transaction; (d) a concurrent transaction identifiers parameter value that specifies identifiers for transactions concurrent with the completed transaction associated to the instance of predictive model 3002; (e) a timing parameter value that specifies the time of day of the occurrence of the transaction (can specify start and stop times), and (f) preceding request data received from external devices 180A-180Z that preceded invoking of the transaction associated to the training dataset. With the concurrent transaction identifiers, there can also be included associated memory utilization and execution time durations parameter values associated to the concurrent transaction identifiers used as training data.

Trained as described, predictive model 3002 is able to learn a relationship, e.g., between transaction identifiers and memory utilization, as well as the relationship between timing parameter values specifying time of day and the occurrence of a transaction, as well as the relationship between preceding request data and the occurrence of a certain transaction. Trained as described, predictive model 3002 is also able to learn the relationship between concurrent transactions and the impact of such concurrent transactions on memory utilization. For example, memory utilization attributes can be different when there are multiple concurrent transactions rather than a single transaction.

Query data for querying predictive model 3002, once trained, can take on various forms. Query data for querying predictive model 3002 can include, e.g., partial parameter values characterizing a transaction. Partial parameter values can include, e.g., a timing parameter value specifying the time of day and preceding request data. In response to the query data, predictive model 3002 can return a prediction, e.g., can return a prediction specifying, for example, a set of transactions invoked and active at a next time, T=TC+1, where TC is the current time. The preceding request data defining query data, in the described example, can be current request data, e.g., currently available by examining logging data of logging data area. In response to the applied query data, predictive model 3002 can return such return data as predictive active transactions during the subsequent time, T=TC+1, as well as memory utilization parameter values for such active transactions. On completion of training for K instances of predictive model (one for each detected transaction), operating system 120 at block 1012 can query the K instances for return of prediction data specifying a predicted state of working memory 1101 at the subsequent time T=TC+1. At block 1012, operating system 120 can output predictive data as set forth in Table A below.

TABLE A

| Transaction modeled | Trained model | Time of query | Predicted transaction parameter values including predicted computing node state parameter values (the predicted computing node state parameter values can include predicted working memory state parameter values at subsequent time T = TC + 1, including predicted transaction memory utilization and execution time duration parameter values for the transaction) | Time associated to predictive state data (T = TC + 1) |
|---|---|---|---|---|
| A001 | M001 | T1 | XX | T = T1 + 1 |
| A002 | M002 | T1 | XX | T = T1 + 1 |
| A003 | M002 | T1 | XX | T = T1 + 1 |
| A001 | M001 | T2 | XX | T = T2 + 1 |
| A002 | M002 | T2 | XX | T = T2 + 1 |
| A003 | M002 | T2 | XX | T = T2 + 1 |
| . . . | . . . | . . . | . . . | . . . |

Operating system 120 can iteratively store the subsequent time predicted transaction parameter values including computing node state parameter values such as working memory state parameter values into logging data area 2501 of data repository 150. The predicted transaction parameter values can include, e.g., computing node state parameter values specifying whether a specified transaction will have been invoked, predicted memory utilization parameter values of the specified transaction, parameter values specifying predicted other transactions currently active and invoked and their states (e.g., committed to working memory or not), and predicted execution time duration for the transaction. According to one embodiment, computing node 10 can deploy the multiple models of Table B according to an ensemble model method. For example, with the multiple models modeling states of computing node 10 and working memory state from the perspectives of multiple different transactions, computing node 10 can aggregate results retuned from multiple models for ascertaining predicted subsequent states of computing node 10 and working memory 1101.

In one aspect, computing node 10 can use predicted transaction parameter values for control of working memory 1101 for purposes of improving execution of one or more transaction. In one aspect, computing node 10 can use a predicted execution time duration for a transaction, e.g., as iteratively provided in a manner described with reference to Table A, and can use the predicted execution time duration parameter value for establishing a priority level for the transaction and use the established priority level for control of working memory 1101 for improving execution of a transaction. In one aspect, computing node 10 can subject a transaction to hold or pause. Computing node 10 can assign a hold to a transaction not yet committed to working memory 1101 and can assign a pause to a transaction that has been committed to working memory 1101. Embodiments herein recognize that system designers can be more tolerant of execution time duration extensions for a transaction in the case that the transaction is expected to have a longer transaction execution time duration satisfying a high threshold than in the case that the transaction is expected to have a shorter transaction time satisfying a low time threshold. Accordingly, in one aspect, computing node 10 can restrict assigning a hold or pause to a transaction unless the transaction is predicted to have an execution time duration satisfying a high threshold. In such an embodiment, computing node 10 can conditionally assign a hold or pause to a transaction conditionally on the condition that the transaction has been predicted to have a transaction execution time duration satisfying a high threshold and conditionally on the condition that that transaction has been assigned a priority level satisfying a low threshold.

FIG. 3B illustrates predictive model 3004 for classifying transactions. Predictive model 3004 for predicting a transaction identifier that has been requested based on system call data and/or request data is described with reference to predictive model 3004 as set forth in FIG. 3B. Predictive model 3004 can be trained with training data and once trained can be configured to respond to query data for return of an identifier for a currently active transaction. Training data for training predictive model 3004 can include a dataset which comprises (a) a transaction identifier for a transaction that has been requested, (b) an application identifier specifying the application, and in some cases, a subroutine of an application that generates one or more system call associated to the transaction, (c) one or more system call identifiers generated by an application for performance of the transaction, and (d) request data for invoking the transaction. The described training datasets can be datasets according to a supervised learning machine learning scheme.

Predictive model 3004 can be trained with use of the simulator that simulates performance of computing node 10 during runtime, according to one embodiment. Predictive model 3004 additionally or alternatively can be trained with use of logging data stored in logging data area 2501. With the system call information applied as training data, there can be associated timing data associated to the system call data, e.g., specifying timing of a first system call in relation to a second system call and so on. Predictive model 3004, once trained, can be configured to respond to query data. Query data for querying predictive model 3002 can include partial system call identifiers, e.g., a partial set of system call identifiers associated to a certain transaction. Training data for training predictive model 3002 can also include, e.g., request data defined by, e.g., keywords included with user-defined or enterprise system-defined requests sent at send block 1801 in order to invoke a certain transaction and/or user identifier data. Embodiments herein recognize that some transactions can be associated to certain user sets. User identifier ID data can include, e.g., network address data of computing nodes associated to requesting client computers of external devices 180A-180Z sending request data at send block 1801. Predictive model 3004, once trained, is able to respond to query data. Query data for querying predictive model 3004 can include, e.g., a partial set of parameter values, e.g., parameter values including one or more of an application identifier including a routine identifier, at least one system call identifier, request data, e.g., keywords defining a request associated to a certain transaction, and/or user identifier data. On completion of training at training block 1012 to train predictive model 3004, computing node 10 can query predictive model 3004 to output predicted parameter values specifying transactions currently active and invoked within computing node 10. The output predictions can be logged into logging data area 2501.

Because logging at logging block 1001 is iteratively performed with logging data stored in logging data area of data repository 150, a current state of working memory 1101 is discoverable by operating system 120 and by memory manager 122 by query of logging data area 2501 of data repository 150. Embodiments herein can include operating system 120 by memory manager 122 querying logging data of logging data area 2501 for ascertaining the current state of working memory 1101, e.g., wherein the current state of working memory 1101 can be defined by parameter values such as transaction identifiers identifying transactions that are currently active and consuming memory space of working memory 1101, parameter values indicating start times of the described transactions, parameter values specifying stop times of the described transactions, and parameter values specifying working memory utilization of the described transactions.

While iteratively performing logging at block 1001 and training at block 1012, computing node 10 can proceed to receive request data which can be iteratively sent by external devices 180A-180Z at send block 1801. External devices 180A-180Z can include, e.g., client computer devices and/or enterprise systems that can iteratively send request data at send block 1801. Request data sent at block 1801 can include a user, e.g., user system and/or enterprise system defined data that invokes transactions that are executed by CPU 1103 of computing node 10.

CPU executed transactions by definition on their performance can require and consume memory space of working memory 1101 on their execution. Embodiments herein can include processes for performance by memory manager 122 of operating system 120 for management of working memory 1101 in association with the execution of one or more transactions executed by CPU 1103 with control of working memory 1101.

A transaction herein can be characterized by a set of actions performed by CPU 1103 in response to one or more request defined by request data sent by one or more external device of external devices 180A-180Z. In some embodiments, there can be a one-to-one correspondence between supported transactions and applications of applications 130A-130Z. In some embodiments, a single application of applications 130A-130Z can support multiple transactions. In some embodiments, multiple transactions can be defined and supported within a single application of applications 130A-130Z.

Transactions herein can take a variety of forms. According to one example, an online shopping scenario session can comprise and can be divided into multiple transactions. For example, there can be (a) an login session transaction in which a user, e.g., enters credentials such as a keyword and password for access to an online item acquisition platform, (b) a searching transaction, e.g., in which a user enters keywords or identification of a product into a user interface portal and receives returned item identifiers and descriptions, and (c) a checkout transaction in which the user completes payment of an acquired item in which various financial institution bank account balances are appropriately debited or credited and wherein shipping arrangements are completed. With reference to the described scenario, computing node 10 can be handling multiple transactions concurrently from different users. For example, computing node 10 can be executing an item acquisition search for a first user simultaneously while executing a login for a second user, while simultaneously executing a checkout for a third user, and so on. A transaction herein can refer to a set of related functions wherein they are related in the sense that if one function of the set of function fails, then the entire transaction fails.

In one aspect, transactions herein can be characterized by system calls. In one example, request data can be received by miming an application, and in response to processing of the request data by the application, the application can present one or more system call to operating system 120. The system call can result in one or more action being executed by CPU 1103 requiring utilization of memory space by working memory 1101.

In response to receipt of request data iteratively sent at block 1801, computing node 10 can perform analyzing at block 1002. Analyzing at block 1002 can include operating system 120 by memory manager 122 performing classifying of the received request data and of system calls resulting therefrom as belonging to a specified one or more transaction. Analyzing at block 1002 can also include examining of current (most recent) working memory state data of working memory 1101 stored in logging data area 1501 of data repository 150. For analyzing at block 1002, memory manager 122 can include iterative query of logging data area 2501 of data repository 150 as is indicated by receive and respond block 1502 of data repository 150. Default processing at block 1004 can include iterative queries of logging data area 2501 of data repository 150 as is indicated by receive and respond block 1503 of data repository 150.

In response to the received query data defined by one or more partial parameter value dataset characterizing a transaction, predictive model 3004 can return a predictive classification as to a transaction that has been invoked. Predictive model 3004, therefore, as shown in FIG. 3B, can output data specifying a certain one or more transaction identifier in response to applied query data, which query data can comprise, e.g., system call data and historical request data read from logging data area 2501 as described in connection with FIG. 3B. Predictive model 3004, in one aspect, can define a classifier for classifying transaction invoking request data and/or responsively generating one or more system call as belonging to a certain transaction having a certain identifier. Computing node 10 at analyzing block 1002 can be examining a state of working memory 1101, e.g., by examining of most recent data stored in logging data area 2501 of data repository 150.

On completion of analyzing block 1002, computing node 10 can proceed to block 1003 to perform accuracy determination. Computing node 10 can perform accuracy determination at block 1003. Operating system 120 by memory manager 122 performing accuracy determination at block 1003 can include operating system 120 ascertaining whether a current state of computing node 10 including working memory 1101 was previously predicted by computing node 10 within a threshold satisfying level of accuracy. The state of computing node 10 can be characterized, e.g., by the set of transactions invoked, the set of transactions committed to working memory, memory utilization parameter values associated to the transactions, and execution time duration parameter values associated to the transactions.

At accuracy determination block 1003, memory manager 122 can ascertain whether a current state of computing node 10 including working memory 1101 matches a predicted state of computing node 10 including working memory 1101 performed during a prior time period. For determining a current state of computing node 10 including working memory 1101, computing node 10, as explained with reference to block 1002, can examine most recent request data, system call data, and working memory state data from logging data area 2501 of data repository 150, and can query predictive model 3004 for return of a classifier specifying an identifier for a one or more currently invoked transaction. For determining a predicted state of computing node 10 including working memory 1101 for a current time, according to a previously performed prediction (prediction performed at time T=TC−1), computing node can examine historical computing node state prediction data from logging data area 2501 of data repository 150 as described in connection with Table A. Memory manager 122 can determine that a current state of computing node 10 including working memory 1101 matches the predicted state of working memory 1101 when the current state of computing node 10, including working memory 1101, exhibits a threshold level of similarity to the predicted state of computing node 10 including working memory 1101.

Memory manager 122 at accuracy determination block 1003 can additionally or alternatively evaluate training data that has been applied for training instances of predictive model 3004 associated to different transactions that may be run by computing node 10. According to one example, memory manager 122 can apply a rule wherein a certain predictive instance of predictive model 3004 associated to a certain transaction is assumed to be incapable of providing predictions within the threshold satisfying level of accuracy unless the predictive model has been subject to N iterations of training datasets.

In response to the determination at block 1003 that return predictions rendered during a prior time period do not satisfy by a threshold level of accuracy, computing node 10 can proceed to block 1004. At block 1004, computing node 10 by memory manager 122 can process a current transaction according to a default processing scheme. According to a default processing scheme, operating system 120 can process incoming transactions independent of a predicted state of computing node 10, including working memory 1101 at subsequent time during a subsequent time period.

On completion of default processing block 1004, computing node 10 can proceed to return block 1005. At return block 1005, computing node 10 can return to a stage preceding analyzing block 1002 so that computing node 10 can receive a next iteration of request data iteratively sent at block 1801.

If on the condition at block 1003 it is determined that the state of computing node 10 and working memory 1101 is within a threshold satisfying level of accuracy, computing node 10 can proceed to block 1007. At block 1007, according to one aspect, any invoked transactions which have been allocated to working memory 1101 can be subject to processing by CPU 1103 in accordance with a proactive memory management configuration established during a preceding iteration of block 1010 to be described further herein. The processing by CPU 1103 at block 1007 can include multiple queries of logging data area 2501 of data repository 150 as is indicated by receive and respond block 1504 of data repository 150. On completion of block 1007, computing node 10 can proceed to block 1009.

At block 1009, computing node 10 can perform predicting of the state of computing node 10 and of working memory 1101 during a subsequent time period T=TC+1, where TC is the current time. Predicting at block 1009 can include multiple iterations of one or more predictive model present in models area 2502 of data repository 150, as is indicated by receive and respond block 1505 performed by data repository 150. Computing node 10 performing predicting at block 1009 can include computing node 10 querying one or more instance of predictive model 3002 as indicated in FIG. 3A. Query data for querying predictive model 3002 can include, e.g., a timing parameter value specifying a time of day, e.g., a time of day corresponding to a subsequent time period T=TC+1, and query data can include additional data such as preceding request data, i.e., which preceding request data corresponding to a future subsequent transaction can be provided by request data received by computing node 10 at a current time, which request data can be ascertained by query of logging data area 2501. Thus, querying of data repository data at block 1009 can include query of models in models area 2502 and of logging data of logging data area 2501. At block 1009, computing node 10 can query N instances of predictive model 3002 as shown in FIG. 3A for each transaction previously detected by computing node 10 for which a predictive model instance has been established and subject to machine learning training. Thus, at block 1009, computing node 10 is able to perform predicting so as to identify future active transactions which are not currently active, i.e., associated to request data not yet received by computing node 10 and having associated characterizing system calls not yet sent to operating system 120 by an application but which yet are predicted to be sent to operating system 120 at the described subsequent time period T=TC+1. In some embodiments, operating system 120 iterative querying of instances of predictive model at block 1012 can provide functions in the performance of predicting at predicting block 1009.

Based on the predicting performed at block 1009, computing node 10 is able to establish a predicted state of computing node 10 and working memory 1101 at the subsequent time period T=TC+1, wherein the state is characterized by a plurality of parameter values, e.g., specifying identifiers for transactions that will have been invoked, e.g., by the receipt of transaction invoking request data, specifying identifiers for transactions that will be concurrently running, memory utilization parameter values associated to such transactions, and allocated memory spaces allocated to the described transactions.

Based on the predicting performed at block 1009, e.g., with use of instances of predictive model 3002 as described in connection with FIG. 3A, computing node 10 can proceed to block 1010. At block 1010, computing node 10 can perform predictive and proactive scheduling of one or more transaction at a subsequent time period T=TC+1. The predictive scheduling can include proactively applying a set of proactive memory management configuration parameter values that proactively establish various controls on working memory 1101 during the subsequent time at the subsequent time T=TC+1. The proactively established memory management control parameter values can advantageously, e.g., prevent memory exhaustion and associated running of memory page-outs to send transaction data of a transaction out to storage memory 1102 after the transaction has begun to execute.

In one embodiment, computing node 10 at block 1009 can perform an initial query of a set of instances of predictive model 3002 for return of a prediction as to which transactions are expected and predicted to be active and invoked during a subsequent time period T=TC+1 and then can re-query the same set of predictive models in a next iteration also at block 1009 using the return data from the initial set of query data. The return data from the initial set of query data can include return parameter values as to a comprehensive set of transactions predicted to be active during a next time TC+1. Thus, the query data at the next iteration can include the additional parameter value enhancing the query data, wherein the additional parameter value enhancing the initial query data is the parameter value of specifying parameters indicating concurrent transactions that are concurrent to the transaction associated to the instance of the predictive model 3002 being queried. With the enhanced query data predictive models, the instances of predictive model 3002 queried can return enhanced and more accurate data as to working memory state parameter values such as memory utilization requirements based on multiple transactions being concurrent as specified by the enhanced query data.

As set forth herein, logging data of logging data area 2501 can include logging data in addition to working memory characterizing parameter values. Logging data of logging data area 2501, according to one example, can include request data, e.g., in the form of keywords that invoke transactions herein. Such request data logging data can be logged, e.g., with use of an application layer program that receives and logs request data defined by a user and/or an enterprise system. Logging data of logging data area 2501 can further include logging data provided by prioritization levels associated to various identified transactions detected during a history of deployment of computing node 10. For example, during performance of predicting at block 1009, computing node 10 can query instances of predictive models 3002 associated to each detected transaction detected to have been executed by computing node 10 to return predictions as to execution time duration associated to the respective ones of the identified transactions.

In one embodiment, computing node 10 by memory manager 122 can assign priority levels in dependence on predicted execution time durations associated to various ones of the detected transactions detected to have been executed historically by computing node 10. As shown in Table B, the different transactions identified by various identifiers can be predicted to have associated execution time durations. Computing node 10 can ascertain the predictions as shown in Table B by querying of instances of predictive model 3002 associated to respective ones of transactions A001, A002, or A003. Computing node 10 can iteratively update the predictions summarized in Table B at iterations of training block 1012 which can be accompanied by querying of trained predictive models.

TABLE B

| Transaction | Predicted Execution Time | Priority |
| --- | --- | --- |
| A001 | 3000 ms | 3 |
| A002 | 1.5 ms | 1 |
| A003 | 175 ms | 2 |

As shown in Table B, computing node 10 by memory manager 122 can assign priority levels to the different transactions based on predicted execution time duration associated to the various transaction so that transactions having longer than baseline predicted execution time durations can be given lower than baseline priority levels, e.g., priority level 3 in the described priority hierarchy ranking system. Computing node 10 can be configured so that the priority rankings specified in Table A can be overwritten by administrator user control. Computing node 10, in one example, can assign priority level 1 to transactions predicted to execute within 2.0 ms, priority level 2 to transactions predicted to execute within from about 2.0 ms to about 500 ms, and priority level 3 to transactions predicted to execute in an execution time duration exceeding about 500 ms. As set forth herein, computing node 10 can use predicted transaction parameter values for control working memory 1101 for purposes of improving execution of one or more transaction. In one aspect, computing node 10 can use a predicted execution time duration for a transaction, e.g., as iteratively provided in a manner described with reference to Table A, and can use the predicted execution time duration parameter value for establishing a priority level for the transaction and use the established priority level for control of working memory 1101 for improving execution of a transaction. In one aspect, computing node 10 can subject a transaction to hold or pause as explained in reference to the flowcharts of FIGS. 2 and 4. Computing node 10 can assign a hold to a transaction not yet committed to working memory 1101 and can assign a pause to a transaction that has been committed to working memory 1101. Embodiments herein recognize that system designers can be more tolerant of execution time duration extensions for a transaction in the case that the transaction is expected to have a longer transaction execution time duration satisfying a high threshold than in the case that the transaction is expected to have a shorter transaction time satisfying a low time threshold. Accordingly, in one aspect, computing node 10 can restrict assigning a hold or pause to a transaction unless the transaction is predicted to have an execution time duration satisfying a high threshold. In such an embodiment, computing node 10 can conditionally assign a hold or pause to a transaction conditionally on the condition that the transaction has been predicted to have a transaction execution time duration satisfying a high threshold and conditionally on the condition that that transaction has been assigned a priority level satisfying a low threshold, e.g., priority 3, in one example, as set forth in Table B.

In response to predicting of a state of working memory 1101 in a next time period T=TC+1, computing node 10 by memory manager 122 can proceed to block 1010 in order to perform proactive and predictive scheduling. In the described scenario described with reference to the flowchart of FIG. 2, proactive and predictive scheduling can include scheduling of execution of incoming transaction that has not yet been invoked at computing node 10 but is predicted to arrive at computing node 10 as of the subsequent time T=TC+1. The predictive scheduling at block 1010 can include and be accompanied by proactive and predictive establishing of memory management control parameter values for control, including for proactive control of working memory 1101 at the future subsequent time T=TC+1.

Figure 4:
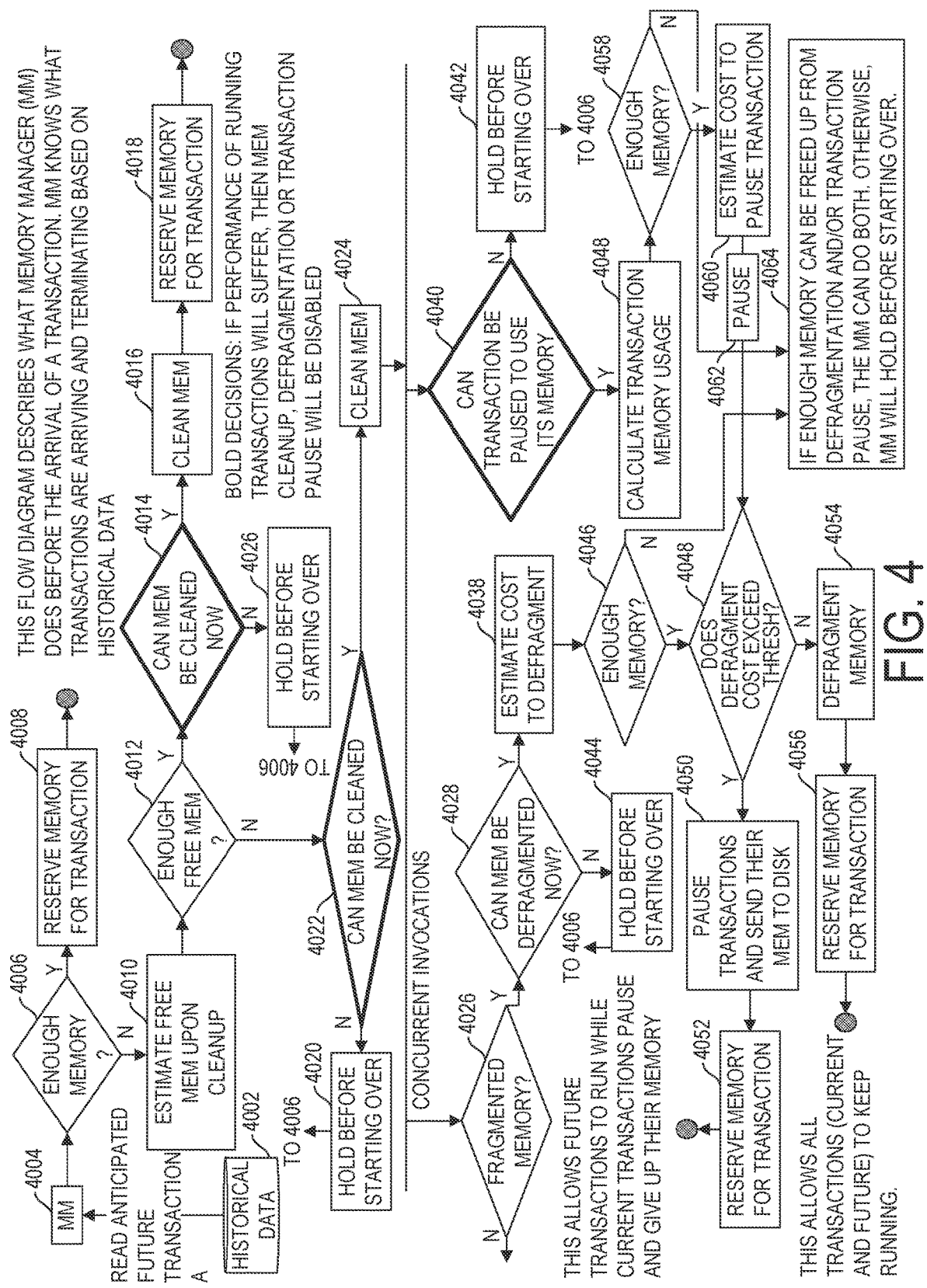
FIG. 4 is a flowchart depicting performance of an operating system memory manager, according to one embodiment.

A method for proactive and predictive establishing of memory management control parameter values is set forth in reference to the flowchart of FIG. 4. Generally referring to the flowchart of FIG. 4, various general schemes are possible for memory management control in accordance with embodiments herein. The flowchart of FIG. 4 and the diagrams of FIGS. 5A-5C depict an embodiment wherein a transaction not yet invoked within computing node 10 is predicted to be invoked at a next subsequent time period T=TC+1.

At block 4004, memory manager 122 can determine with use of historical data of data repository 150 (block 4002) a predicted and anticipated future transaction A that will be invoked by next time period T=TC+1. The predicting at block 4004 with use of historical data can include using machine learning trained predictive models trained with historical data as set forth herein.

Figure 5A:
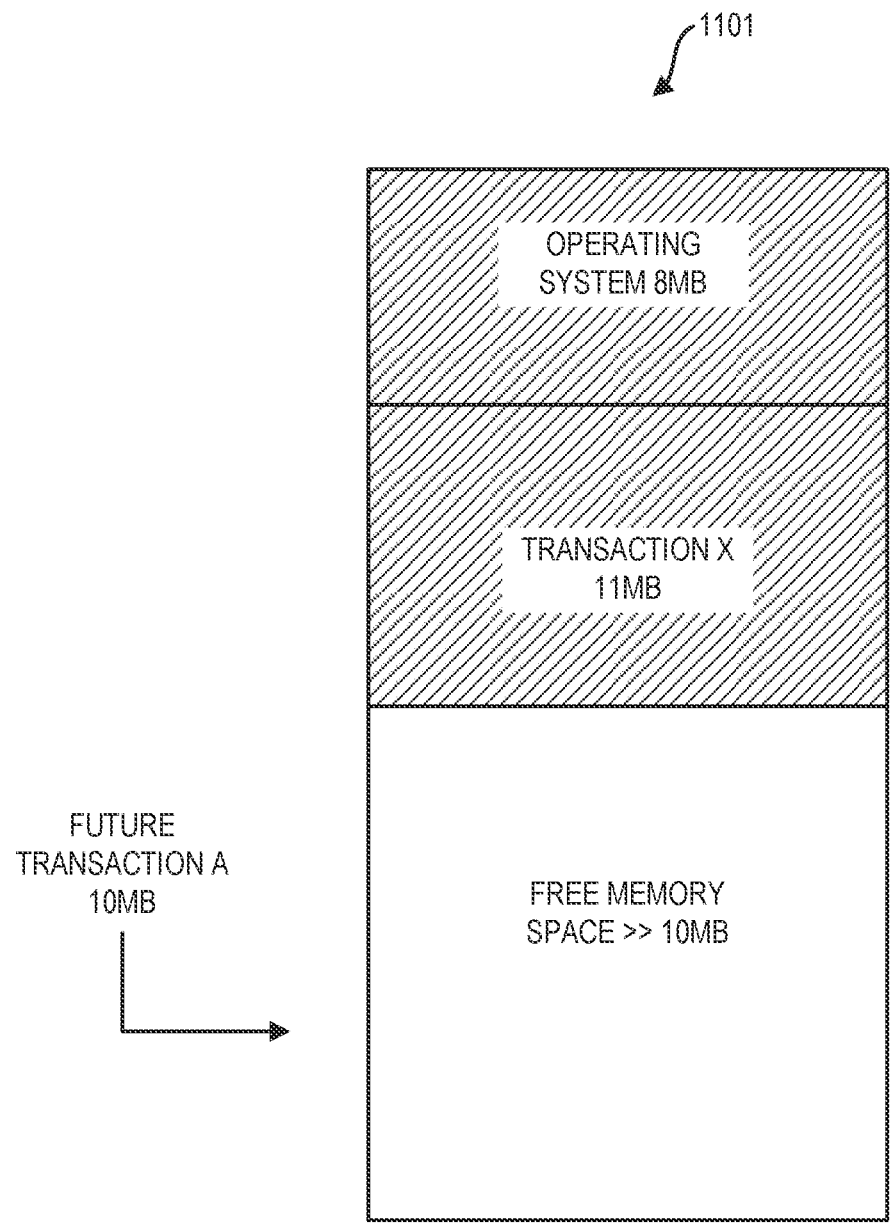
FIGS. 5A-5C are working memory maps depicting various configuration controls that can be performed with reference to a working memory, according to one embodiment.
Figure 5B:
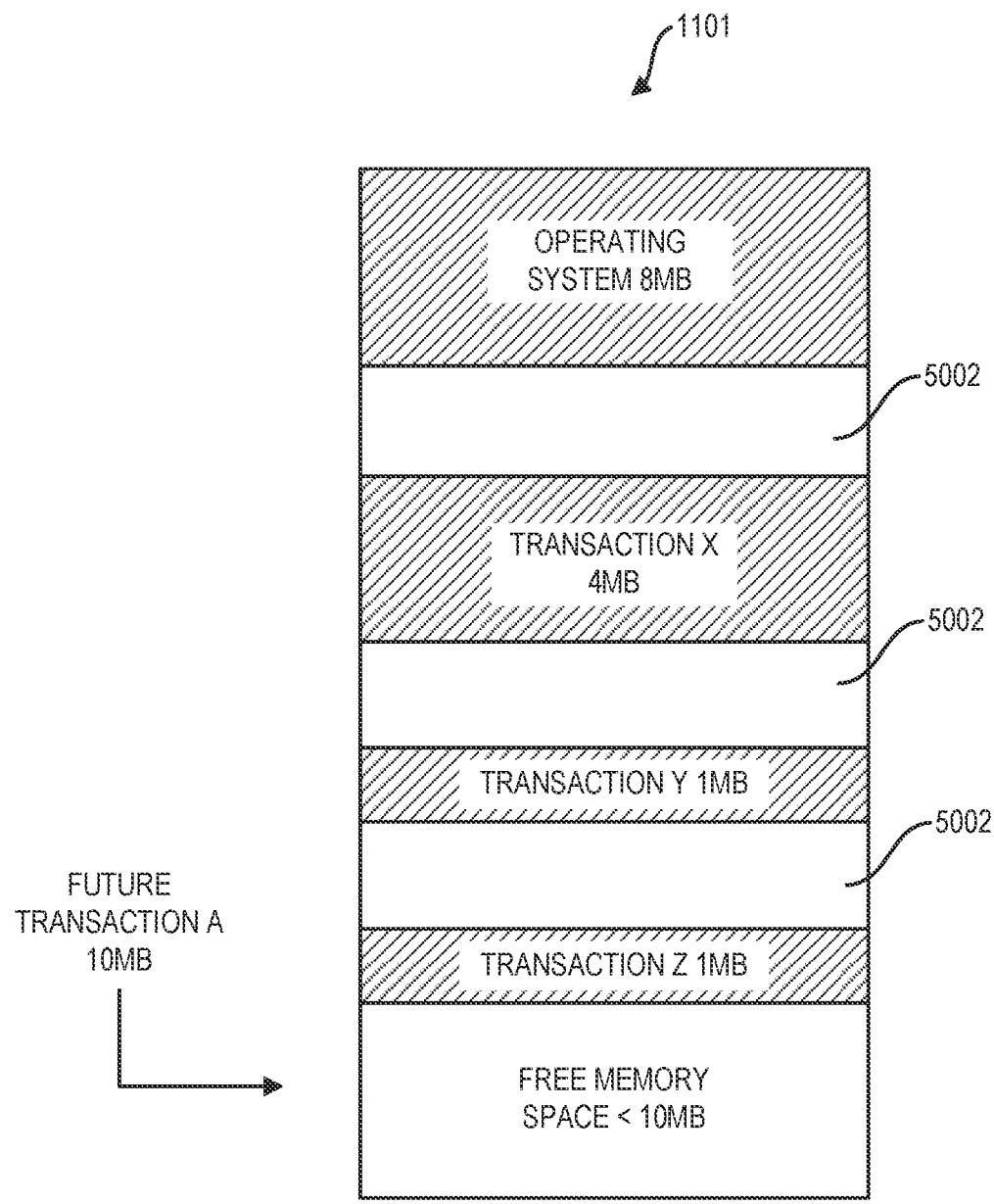
Figure 5C:
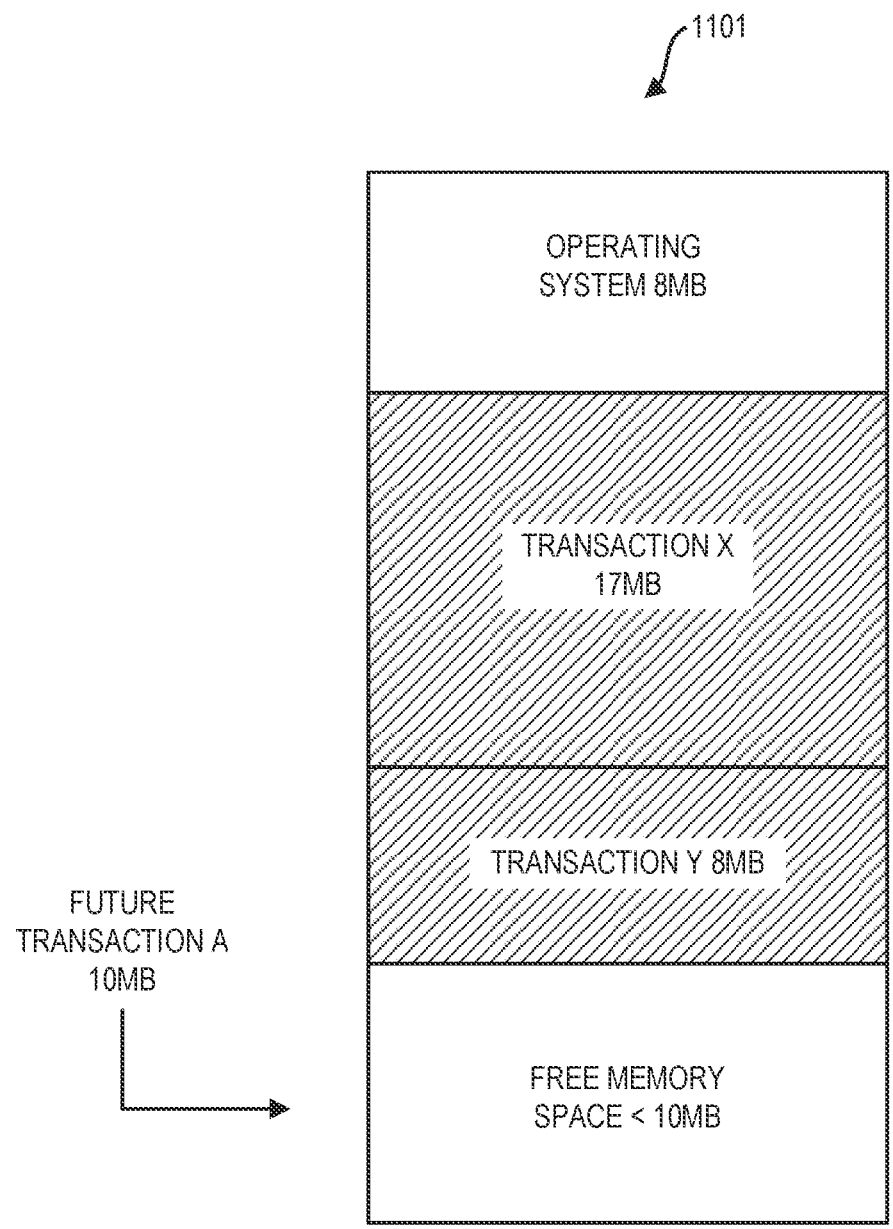

With reference to FIGS. 5A-5C and in reference to the flowchart of FIG. 4, a number of generally described results are possible. FIGS. 5A-5C depict variations of a predicted future state of working memory 1101 in the next time period TC=TC+1. A number of variations of possible actions by memory management 122 in proactively configuring working memory 1101 are possible.

Referring to the scenario depicted in FIG. 5A, memory manager 122 can predict that future transaction A, which has not yet been invoked at computing node 10, can have a memory utilization requirement of 10 megabytes and can determine with reference to the scenario in FIG. 5A that the predicted free space of working memory 1101 greatly exceeds 10 MB. Therefore, in the scenario depicted in FIG. 5A, memory manager 122 can pre-allocate and reserve free space memory within working memory 1101 sufficient to support the processing of future transaction A.

In the scenario depicted in FIG. 5B, according to the predicted future state of working memory 1101, there is memory space consumption by transaction X, transaction Y, and transaction Z. However, in the scenario depicted in FIG. 5B, memory manager 122 can determine that transaction X, transaction Y, and transaction Z are no longer needed, and therefore memory manager 122, in the scenario depicted in FIG. 5B, can determine that the memory stored data associated to transaction X, transaction Y, and transaction Z can be subject to cleanup to permit an increase in the free space memory allocation for future transaction A predicted to have a future memory utilization requirement of 10 MB. In the scenario depicted in FIG. 5B, memory manager 122, in some cases, can determine that the execution of identified future transaction A can be subject to a hold to permit time for cleanup of memory stored data associated to unneeded transaction X, transaction Y, and transaction Z.

In one embodiment, working memory 1101 can be configured as an array of single byte storage locations. A clean memory location can include a null character stored, while a used memory has a non-null character stored. In one aspect, working memory 1101 can include memory references that refer to chunks of memory locations. In one embodiment, the process of working memory cleanup can include examining all memory references to identify which reference is an 'orphan" reference, i.e., a reference that is not used by a transaction. If the reference is orphan, then each element/location of the corresponding memory array defined by working memory 1101 can be set to null. With cleanup performed, memory space of the described memory array can be made available for other transactions.

In the scenario depicted in FIG. 5C, predicted future transaction A is predicted to have a future memory utilization requirement of 10 MB. However, the predicted future free space memory of working memory 1101 and the predicted future state is predicted to have free space memory of less than the required 10 MB. Further, transaction X and transaction Y can be determined to be required.

In the scenario depicted in reference to FIG. 5C, one or more of transaction Y and transaction X can be subject to transaction pausing to reduce the memory consumption of transaction X and/or transaction Y. In one scenario, pausing of transaction Y can decrease the memory utilization requirement of transaction Y, e.g., from 8 MB to 4 MB, therefore freeing up additional free space memory for support of the identified future transaction A requiring memory utilization of 10 MB.

In some use cases described with reference to the flowchart of FIG. 4, and the memory maps of FIGS. 5A-5C, computing node 10 can pause a concurrent transaction without page-out of transaction data associated to the transaction, and in some, computing node 10 can pause a concurrent transaction with page-out of transaction data associated to the paused transaction. The pause without a page-out can be performed in certain cases when memory manager 122 determines that the concurrent transaction that is executing may need a bigger chunk of memory in the future and the incoming transaction is more important. If the concurrent transaction is not paused, it will grab additional chunks of free space memory of working memory 1101 leaving too little free space memory for the incoming transaction. In this case, the pause can be performed without the memory page-out. However, when the incoming transaction requires free space memory that will not be available unless the current transaction's memory is paged out, then memory manger 122 can pre-emptively page-out the concurrent transaction's memory. Computing node 10 can pause a concurrent transaction, e.g., by assigning the execution thread associated to the transaction in a CPU wait queue of CPU 1103.

Referring again to the flowchart of FIG. 4, blocks 4006 and 4008 refer to the situation described in connection with FIG. 5A, where memory manager 122 can ascertain that there is sufficient memory space in working memory 1101 to support the predicted future transaction A predicted to have been invoked at the time T=TC+1. At block 4006, memory manager 122 can ascertain that there is enough free space memory in working memory 1101 to support execution of the incoming transaction A and responsively to such determination can proceed to block 4008 to reserve memory for the predicted future transaction, transaction A.

In any of the decision blocks of the flowchart of FIG. 4, e.g., block 4006, decision block 4012, decision block 4014, decision block 4022, decision block 4026, decision block 4028, decision block 4040, decision block 4046, decision block 4058, and decision block 4048, or other blocks where memory manager 122 provides an estimate of a value, memory manager 122 can apply Eq. 1 below.

$$V = V1 \cdot W1 + V2 \cdot W2 \quad \text{(Eq. 1)}$$

Where V is the value estimated, V1 is the value ascertained based on the predicted future state of computing node 10 and working memory 1101 based on the predicting performed at predicting block 1009, and V2 is the value of the item being considered based on the current state of working memory 1101, which can be determined by memory manager 122 querying data logging data area 2501 of data repository 150 and wherein W1 and W2 are weights associated to values V1 and V2, respectively.

Embodiments herein recognize that predicting the future state of working memory 1101 can be useful not only in the sense that predicted future transactions such as the described transaction A can be predicted to occur using predictive processing as set forth herein, but also that certain transactions that are currently consuming memory space within working memory 1101 can be predicted to terminate at a certain time in the discernible future to yield additional free memory space. Embodiments herein recognize that predictions as to transactions can impact action decisions in respect to estimates of free space memory within working memory 1101.

Memory manager 122 on determination at block 4006 that there is insufficient memory space in working memory 1101 can proceed to block 4010. At block 4010, memory manager 122 can estimate the amount of free memory space there will be in working memory 1101 on cleanup of working memory 1101, and at block 4012, memory manager 122 can determine whether there will be enough free memory space within working memory 1101 on cleanup of working memory 1101.

On the determination at block 4012 that there will be sufficient free space memory on cleanup of working memory 1101, memory manager 122 can proceed to block 4014. At block 4014, memory manager 122 can ascertain whether working memory 1101 can be cleaned currently. On determination that working memory 1101 can be cleaned currently, memory manager 122 can proceed to block 4016 to clean working memory 1101 and then can proceed to block 4018 to reserve free memory space for the predicted future transaction, transaction A.

At block 4014, memory manager 122, can determine, in some instances, that working memory 1101 cannot be cleaned currently. In such use cases, memory manager 122 can proceed to block 4026 to hold the predicted future invoked transaction, transaction A, from execution, e.g., by maintaining the predicted future transaction, transaction A, in a job queue without committing the transaction to working memory 122.

In some instances, memory manager 122 at block 4012 can determine that there is insufficient free memory even after cleanup of working memory 1101. In such instances, memory manager 122 can proceed to block 4022 in order to determine whether working memory 1101 can be subject to cleaning in any respect to increase an amount of free memory space within working memory 1101.

On the determination at block 4022 by memory manager 122 that working memory 1101 cannot be subject to cleaning now, memory manager 122 can proceed to block 4020 in order to hold the predicted future transaction, transaction A, from executing on it being invoked. Referring to the flowchart of FIG. 4, embodiments herein recognize that if there has been a reservation of free memory space at block 4008, then working memory 1101 will be configured so that at the future time TC=TC+1, on the invocation of the predicted future transaction, transaction A, that transaction A will be executed without delay on it being invoked. If, on the other hand, block 4026 or block 4022 is activated to hold execution of the predicted future transaction, transaction TA, then working memory 1101 can be configured so that at the next time T=TC+1, the predicted future transaction, transaction A, will be held from executing, e.g., in a job queue, responsively to it being invoked rather than being committed to working memory 1101 and executed responsively to and immediately on it being invoked.

The proactive configuration for working memory 1101 can be iteratively updated at each iteration of block 1010 of the flowchart of FIG. 2. Still referring to the flowchart of FIG. 4, memory manager 122, on the determination at block 4022 that working memory 1101 can be cleaned currently, can proceed to take action to clean working memory 1101 and can proceed to block 4024. At block 4024, memory manager 122 can clean working memory 1101. Referring to the remaining blocks, the action of block 4024 to clean working memory 1101 based on the logic of the described flowchart of FIG. 4 may not be sufficient alone to create enough sufficient free space for the execution of the predicted future transaction, transaction A. Nevertheless, the performance of cleaning at block 4024 can produce a maximum amount of free space within working memory 1101 without performance of alternative processes such as defragmentation or transaction pausing. At block 1010, operating system 10 can be iteratively querying data repository 150 as is indicated by receive and respond block 1506 of data repository 150.

Transaction holding as set forth herein can refer to the holding from execution of the identified future transaction, transaction A, referenced in the flowchart of FIG. 4 and in the memory space diagrams of FIGS. 5A-5C. Transaction pausing herein can refer to the pausing of concurrent transactions that can be supported concurrently for concurrent execution with the identified future transaction, transaction A. Referring to the remaining blocks of the flowchart of FIG. 4, memory manager 122 can establish different additional memory management configuration control parameter values to permit execution of multiple transactions while avoiding memory exhaustion and page-out of working memory transaction data to stored memory.

Referring to remaining blocks of the flowchart of FIG. 4, memory manager 122 can perform additional processes to permit execution of multiple transactions while avoiding memory exhaustion. Referring to block 4040, memory manager 122 at block 4040 can determine whether a concurrent transaction at the next time period TC=T+1 can be paused to reduce the memory utilization requirement of the concurrent transaction. For example, referring to FIG. 5C, transaction Y predicted to be invoked at the next time period can be subject to memory utilization requirement reduction by pausing of transaction Y.

On the determination that the identified concurrent transaction can be subject to a pause, memory manager 122 can proceed to block 4048. At block 4048, memory manager 122 can calculate the current memory utilization of identified concurrent transaction, e.g., transaction Y in the described example, and then can proceed to block 4058 to determine whether by pausing the transaction, there will be enough free memory space to support the identified future transaction of the described example, namely transaction A. For example, with reference to the memory map of FIG. 5C, pausing transaction Y might reduce the memory utilization requirement of transaction Y, e.g., from 8 MB to 4 MB, in one example.

If on the determination at block 4058 that there will be sufficient free memory space created by the pausing of the identified concurrent transaction, memory manager 122 can proceed to block 4060. At block 4060, memory manager 122 can estimate the cost to pause the identified concurrent transaction and at block 4060 can proceed to pause the identified concurrent transaction based on a determination that the estimated cost satisfies a threshold. Memory manager 122 then can proceed to block 4048, which is described further herein. If on the determination at block 4040 that the identified concurrent transaction, e.g., transaction Y in the described example, cannot be subject to pause, memory manager 122 can proceed to block 4042 in order to hold the identified future transaction, transaction A, so that the identified future transaction A will be held from execution, e.g., in a job queue upon being invoked at a future time, e.g., time T=TC+1.

If on the determination at block 4058 by memory manager 122 that there will be insufficient free space memory to facilitate execution of the identified future transaction, transaction A, memory manager 122 can proceed to block 4064. At block 4064, memory manager 122 can hold the identified future transaction, transaction A, so that the future transaction, transaction A, will be held from execution, e.g., in a job queue, responsively to being invoked rather than executed responsively to being invoked. The holding of the future transaction, transaction A, which is not yet invoked can permit concurrent transactions to proceed to termination prior to reservation of free space memory of working memory 1101 to the identified future transaction, transaction A.

With further reference to the flowchart of FIG. 4 at block 4026, memory manager 122 can ascertain whether working memory 1101 includes fragmented memory. FIG. 5B can also be useful to illustrate a fragmented memory situation as well as a memory cleaning situation. In one embodiment, the illustrated concurrent transactions, transaction X, transaction Y, and transaction Z, can be concurrent and necessary transactions. However, in the described embodiment of FIG. 5B, the concurrent transactions X and Y and Z can consume memory space locations that can be regarded to be fragmented in that they together do not define a contiguous set of memory spaces of working memory 1101. Instead, the indicated memory spaces for transaction X, transaction Y, and transaction Z define gaps 5002 which do not define sufficient contiguous free space memory for supportive operations of identified future transaction, transaction A, which in the described example may require 10 MB of contiguous memory space. Gaps 5002 together may exceed a pre-memory space of more than 10 MB. However, since the free space locations are not contiguous, the combined more than 10 MB may not be sufficient to support the execution of the identified future transaction, transaction A.

If at block 4026 memory manager 122 determines that working memory 1101 does, in fact, include fragmented memory, memory manager 122 at block 4026 can proceed to block 4028 to determine whether working memory 1101 can be defragmented currently. On the determination that working memory 1101 can be subject to defragmentation currently, memory manager 122 can proceed to block 4038. At block 4038, memory manager 122 can estimate a cost to perform defragmentation of working memory 1101 and then can proceed to block 4046. At block 4046, memory manager 122 can determine whether with the performance of defragmentation, there will be enough free space memory to support execution of the future identified transaction, transaction A, in the described example.

If memory manager 122 at block 4046 determines that there will still be insufficient free space memory, even on the performance of defragmentation, memory manager 122 can proceed to block 4062. At block 4062, memory manager 122, on the determination that there will be insufficient free space memory in working memory 1101, even on defragmentation, memory manager 122 can subject the identified predicted future transaction, transaction A, to hold so that responsively to its future time invocation, the identified future transaction, transaction A, will be held rather than executed, e.g., to permit termination of one or more concurrent transaction. Referring again to block 4028, memory manager 122 at block 4028 can determine that working memory 1101 cannot be subject to defragmentation currently. On such a determination, memory manager 122 can proceed to block 4044. At block 4044, memory manager 122 can subject the identified future transaction, transaction A, to hold so that the identified future transaction, transaction A, at the next time period T=TC+1 will be subject to hold on its invocation, e.g., holding within a job queue rather than being executed.

Referring again to block 4046, memory manager 122 at block 4046 can ascertain whether there will be sufficient free space memory in working memory 1101 on the performance of defragmentation. If on the determination that there will be sufficient free space memory within working memory 1101 on defragmentation thereof, memory manager 122 can proceed to block 4048. At block 4048, memory manager 122 can determine whether defragmentation cost exceeds a threshold. If the cost of performing defragmentation does not exceed the threshold, memory manager 122 can proceed to block 4054. At block 4054, memory manager 122 can proceed to defragment working memory 1101. Memory spaces defining fragmented memory with gaps 5002 as shown in FIG. 5B can be arranged so that memory allocations to different transactions, e.g., transaction X, transaction Y, and transaction Z as shown in the example of FIG. 5B are rearranged to define contiguous memory space locations without gaps 5002 in order to increase an amount of contiguous free space memory defined by working memory 1101 as shown in FIG. 5B.

Upon completion of block 4054, memory manager 122 can proceed to block 4056. With working memory 1101 rearranged by defragmentation to define extensive contiguous free space memory, memory manager 122 at block 4056 can reserve memory allocations to the predicted future transaction, transaction A, in the described example. If on the determination at block 4048 by memory manager 122 that defragmentation costs will, in fact, exceed a cost threshold, memory manager 122 can proceed to block 4050. At block 4050, memory manager 122 can pause concurrent transactions and page-out memory store data associated to the transaction to storage memory 1102 as shown in FIG. 1. Memory manager 122 can then proceed to block 4052. At block 4052, memory manager 122 can reserve created free space memory of working memory 1101 to the identified predicted future transaction, transaction A.

On completion of block 4060, memory manager 122 can proceed to block 4062. At block 4062, memory manager 122 can pause the described concurrent transaction, e.g., transaction Y described in reference to FIG. 5C, in order to reduce at a next time (time T=TC+1) memory utilization associated to transaction TY described with reference to FIG. 5C. The pausing at block 4062 can be performed without page-out.

With the concurrent transaction, transaction TY, identified, memory manager 122 can be configured to provide a set of predictive memory management control parameter values so that on invocation of the predicted future transaction, transaction A, at the future time T=TC+1, transaction TY, in the described example, will be paused on the invocation of the predicted future transaction TA.

Referring to blocks 4050 and 4062 with reference to the flowchart of FIG. 4, and the memory maps of FIGS. 5A-5C, computing node 10 can pause a concurrent transaction without page-out of transaction data associated to the transaction, and in some use cases, computing node 10 can pause a concurrent transaction with page-out of transaction data associated to the paused transaction. The pause without a page-out, e.g., at block 4062, can be performed in certain cases when memory manager 122 determines that the concurrent transaction that is executing may need a bigger chunk of memory in the future and the incoming transaction is more important. If the concurrent transaction is not paused, it will grab additional chunks of free space memory of working memory 1101 leaving too little free space memory for the incoming transaction. In this case, the pause can be performed without the memory page-out. However, when the incoming transaction requires free space memory that will not be available unless the current transaction's memory is paged out, then memory manger 122, e.g., at block 4050, can pre-emptively page-out the concurrent transaction's memory. Computing node 10 can pause a concurrent transaction, e.g., by assigning the execution thread associated to the transaction in a CPU wait queue of CPU 1103.

With reference to the flow chart of FIG. 4 and the working memory diagrams of FIG. 5A-5C, it is seen that embodiments herein can permit and facilitate the performance of multiple transactions while avoiding memory exhaustion and memory page-out, wherein transaction data stored in working memory 1101 is paged out to storage memory 1102. Various actions can be performed for avoidance of memory exhaustion and/or page-out, including, e.g., cleaning of working memory, holding of an identified future transaction predicted to be invoked, pausing one or more concurrent transaction that is predicted to be concurrent with a predicted future transaction predicted to be invoked, and/or defragmenting of working memory for increase of contiguous address locations defining continuous free space of working memory 1101.

As set forth herein, computing node 10 can use predicted transaction parameter values for control of working memory 1101 for purposes of improving execution of one or more transaction. In one aspect, computing node 10 can use a predicted execution time duration for a transaction, e.g., as iteratively provided in a manner described with reference to Table A, and can use the predicted execution time duration parameter value for establishing a priority level for the transaction and use the established priority level for control of working memory 1101 for improving execution of a transaction. In one aspect, computing node 10 can subject a transaction to hold or pause as explained in reference to the flowcharts of FIGS. 2 and 4. Computing node 10 can assign a hold to transaction not yet committed to working memory 1101 and can assign a pause to a transaction that has been committed to working memory 1101. Embodiments herein recognize that system designers can be more tolerant of execution time duration extensions for a transaction in the case that the transaction is expected to have a longer transaction execution time duration satisfying a high threshold than in the case that the transaction is expected to have a shorter transaction time satisfying a low time threshold. Accordingly, in one aspect, computing node 10 can restrict assigning a hold or pause to a transaction unless the transaction is predicted to have an execution time duration satisfying a high threshold. In such an embodiment, computing node 10 can conditionally assign a hold or pause to a transaction conditionally on the condition that the transaction has been predicted to have a transaction execution time duration satisfying a high threshold and conditionally on the condition that that transaction has been assigned a priority level satisfying a low threshold, e.g., priority 3 in one example as set forth in Table B, or, in another embodiment, priority 2 in one example as set forth in Table B.

In some embodiments, computing node 10 can restrict performance of a hold or pause, in dependence on an examination of priority levels assigned to transactions predicted to be active at the subsequent time, T=TC+1. In one example, computing node 10 can determine that transaction A will have been invoked at time T=TC+1 and that transaction X will be concurrent and committed to working memory 1101 at time T=TC+1. In the described example, computing node 10 can enable a hold on transaction A conditionally on the condition that transaction A has been assigned a lower priority within Table B than transaction X based on predicted execution time duration. In the described example, computing node 10 can restrict a hold on transaction A conditionally on the condition that transaction A has been assigned a higher priority within Table B than transaction X based on predicted execution time duration. In the described example, computing node 10 can enable a pause of transaction X conditionally on the condition that transaction X has been assigned a lower priority within Table B than transaction A based on predicted execution time duration. In the described example, computing node 10 can restrict a pause of transaction X conditionally on the condition that transaction X has been assigned a higher priority within Table B than transaction A based on predicted execution time duration.

On completion of block 1010, computing node 10 can proceed to block 1011. At block 1011, computing node 10 can return to a stage prior to block 1001 to iteratively perform logging of logging data into logging data area 2510 of data repository 150, and then computing node 110 can perform a next iteration of select blocks of blocks 1002-1011, and 1012. Computing node 10 can iteratively perform blocks of blocks 1002-1011, and 1012 for a deployment period of system 1000. In one embodiment, computing node 10 at block 1010 can initiate performance of one or more action specified by one or more working memory control parameter value of a proactive working memory control configuration established at block 1010 that is capable of being performed at the time of block 1010. The one or more action can include, e.g., initiating pausing an identified concurrent transaction with or without page-out, initiating cleaning working memory 1101, and/or initiating defragmenting of working memory. Computing node 10 can continue the performance of the initiated one or more action at a next iteration of block 1007 conditionally on a result of the accuracy check at block 1003.

Embodiments herein recognize that when a Java or non-Java process memory grows in size, memory contention may happen. In such contentions, operating systems, such as Linux, can perform a page-out to page some of the process memory out or employ the Out-Of-Memory killer to terminate a process to free up memory. Both actions (paging out memory and killing a process) are done so that the host kernel processes stay healthy. However, embodiments herein recognize that paging memory out or killing such a process can be very disruptive as the process may be processing important transactions.

Embodiments herein provide more elegant solutions to deal with such memory contentions, wherein multiple transactions can require memory space of working memory for execution. Embodiments herein can include a memory manager that learns about many aspects of transactions being executed in a computing environment. The memory manager can learn about transaction priority, transaction times of execution, transaction memory requirements, when they execute, how long they execute and what resources they use.

On performance of a learning process, a memory manager can use transaction priorities and their memory allocation requests to decide which transaction to run. Once the memory manager learns, a memory manager can decide the following: (a) what transactions to execute; (b) what transactions to temporarily hold before entering the runtime environment (holding the transaction can be performed to avoid memory exhaustion that would happen if the transaction were allowed to proceed); (c) what transactions to pause when they are executing in the runtime environment. Pausing a transaction can be performed, and in some instances, the corresponding memory associated to a transaction subject to pause can be paged out to disk to allow a more important incoming transaction to execute. Pausing can be performed to prevent a memory exhaustion. Alternatively, instead of paging the transaction out, if the memory currently consumed by the transaction is insignificant, a transaction can be paused without paging its memory out if memory manager 122 determines the transaction is about to request large chunks of working memory. Additional decisions of memory manager 122 can include (d) pre-allocating the memory requirements before the arrival of certain transactions. If a transaction requires a large contiguous chunk of memory space of working memory 1101, memory manager 122 can prepare the large chunk of memory before the arrival of the certain transaction. Such preparation can be accompanied by a number of processes, e.g.: (i) cleaning memory space of the process where the transaction will run; (ii) compacting memory of one or more processes; (iii) ensuring the process memory space is clean before the arrival of certain transactions; or (iv) delaying process memory cleanup if it determines that will incur overhead to existing running transactions.

Referring again to the flowchart of FIG. 4, additional operations of memory manager 122 are described. Referring to FIG. 4, memory manager 122 can examine historical data that specifies to memory manager 122 what transactions/requests are about to arrive in the next period of time (for example, the next 5 minutes). The examination of a historical model can include training and querying of predictive models 3002 and 3004 as set forth herein. The historical data can be iteratively logged as memory manager 122 learns the various transactions that flow through and get executed in computing environment 100. This type of historical data is relatively easy to obtain, e.g., through various techniques such as parsing web server logs, Java EE server logs, monitoring agents that run inside Java EE servers, and the like. Transaction priorities may also be included in the historical data repository or read by memory manager 122 through other processes.

Memory manager 12 can identify and prioritize transactions that are about to arrive. Memory manager 122 can check whether enough free space memory in working memory 1101 exists. If there is enough free space memory, memory manager 122 can reserve the right amount of free space memory in working memory 1101 for these transactions. If there is not enough free space memory in working memory 1101, memory manager 122 estimates how much free space memory can be made available.

Still referring to the flowchart of FIG. 4, memory manager 122 can, e.g., examine live and dead data objects for determination of an amount of free space memory that can be made available. For example, the Java heap has live and dead (garbage) objects. In one example, free space memory that can be made available can be calculated in the mark phase. Memory manager 122 can check if enough free space memory in working memory 1101 will be available. If the answer is yes, memory manager 122 can check whether working memory 1101 can be cleaned up now (block 4014). If working memory 1101 cannot be cleaned up now, memory manager 122 can hold a predicted incoming subsequent transaction (block 4026). Then, memory manager 122 can start over.

One reason that memory manager 122 may not be able to clean the memory now is that higher priority transactions may be currently executing in environment 100. If working memory 1101 can be cleaned up now, memory manager 122 can clean up working memory (block 4106), then reserve memory (block 418) for an incoming transaction. If enough free space memory cannot be freed up, memory manager 122 can check additional options; namely memory defragmentation and/or claiming additional free space memory from pausing existing transactions.

In one embodiment, computing environment 100 can be provided by an orchestrated container environment characterized by multiple container-based virtual machines (VMs) hosted on multiple computing nodes 10 provided by physical computing nodes. In one embodiment, first and second transactions herein can be concurrently invoked within computing node 10 and can be first and second transactions that are respectively invoked by request data respectively received by a first container-based virtual machine and a second container-based virtual machine (first and second containers). The first and second containers in the described embodiment can be concurrently commonly hosted by computing node 10 provided by a physical computing node. In one embodiment, computing environment 100 can include an orchestrated container environment provided by a Kubernetes® orchestrated container environment. Kubernetes® is a trademark of the Linux Foundation. In one embodiment, the first and second commonly hosted containers in the described embodiment can be configured as a multi-container Pod™ in a Kubernetes® orchestrated container environment.

Various available tools, libraries, and/or services can be utilized for implementation of predictive model 3002 and/or predictive model 3004. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, and monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, and monitoring and retraining deployed models. Predictive model 3002 and/or predictive model 3004 can employ use of, e.g., neural networks, support vector machines (SVM), Bayesian networks, random forests, regression analytics, Fourier curve fitting and/or other machine learning technologies.

Certain embodiments herein may offer various technical computing advantages and practical advantages involving computing advantages and practical advantages to address problems arising in the realm of computer networks and computer systems. Embodiments herein can feature a computing node that trains various predictive models by machine learning. The predictive models can be queried for return of predictions as to the future state of a computing node. By predicting the future state of a computing node, transactions that have not yet been invoked can be predicted to be invoked within a future time. Based on a predicted future state of a computing node, working memory control configuration parameter values can be proactively established. Various memory management control configuration parameter values can be established so that a predicted future transaction which has not yet been invoked but is predicted to be invoked can be executed together with one or more additional concurrent transaction. Actions to facilitate execution of multiple transactions while avoiding memory exhaustion and/or memory page-out can include, e.g., holding from execution of predicted future transaction, cleaning memory spaces of a working memory to increase a defined free space memory address locations of the working memory, pausing one or more concurrent transaction that is predicted to be concurrent with the identified future transaction, and/or performing defragmentation of a working memory to increase defined free memory space of the working memory. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 6:
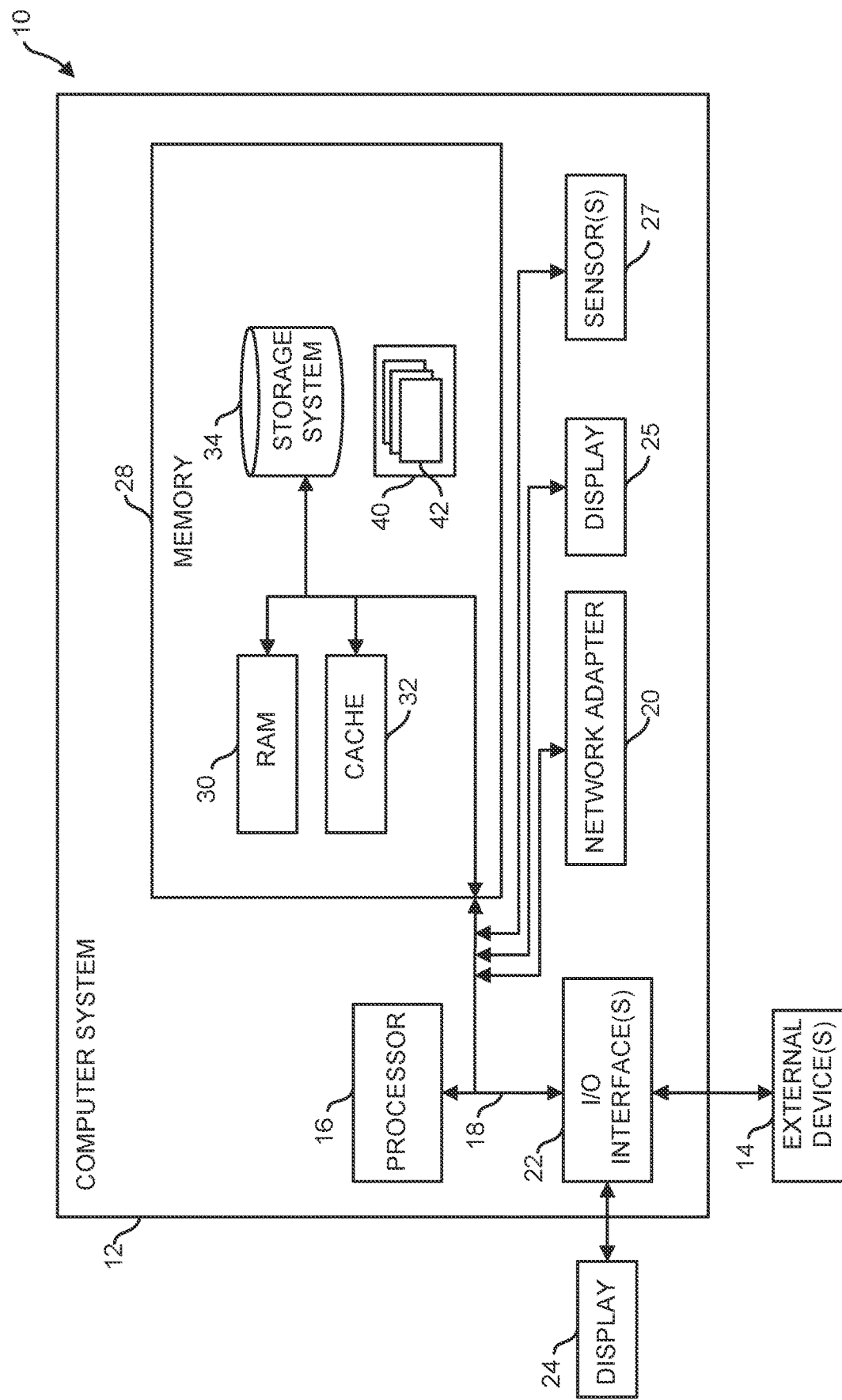
FIG. 6 depicts a computing node according to one embodiment.
Figure 7:
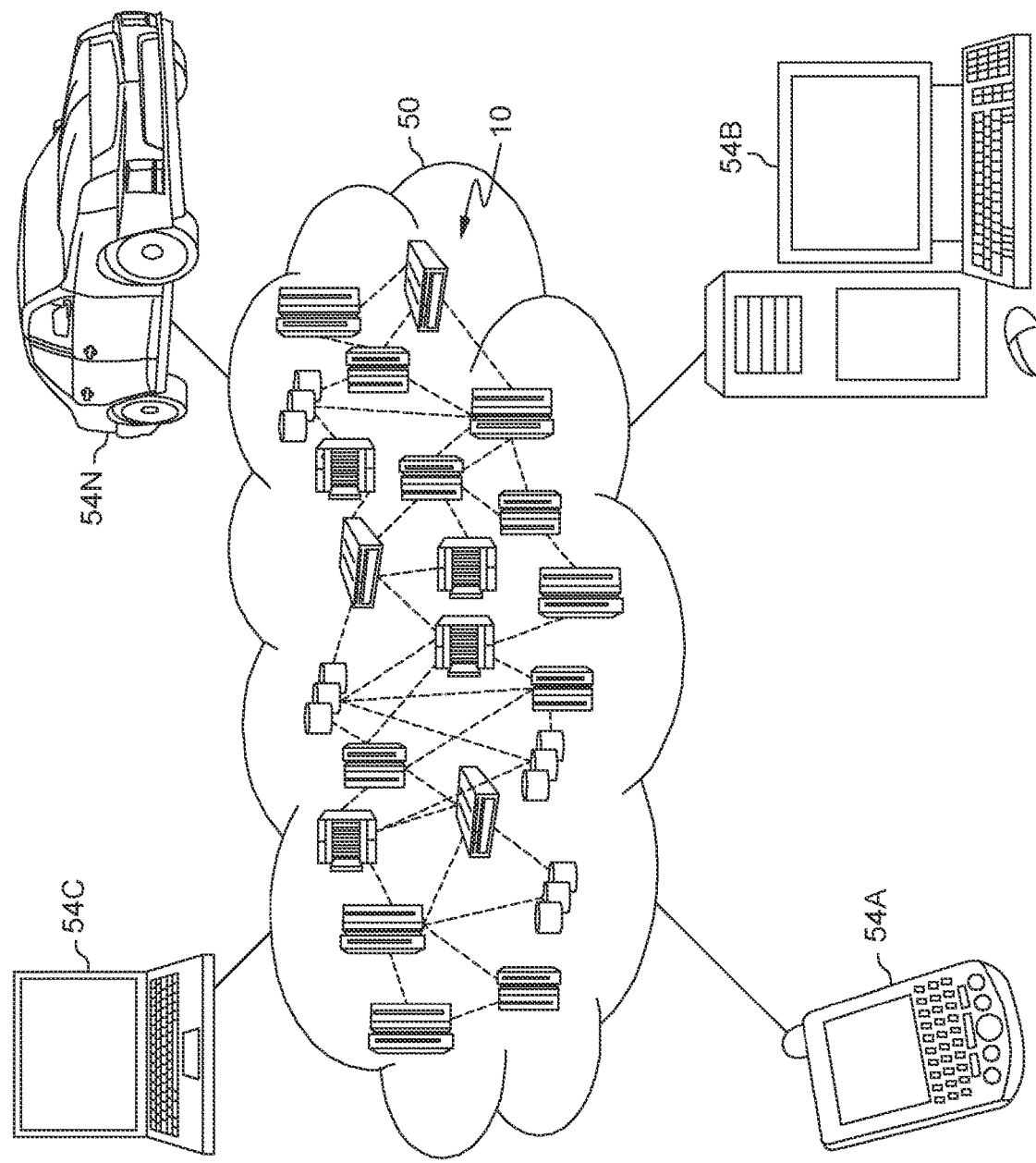
FIG. 7 depicts a cloud computing environment according to one embodiment.
Figure 8:
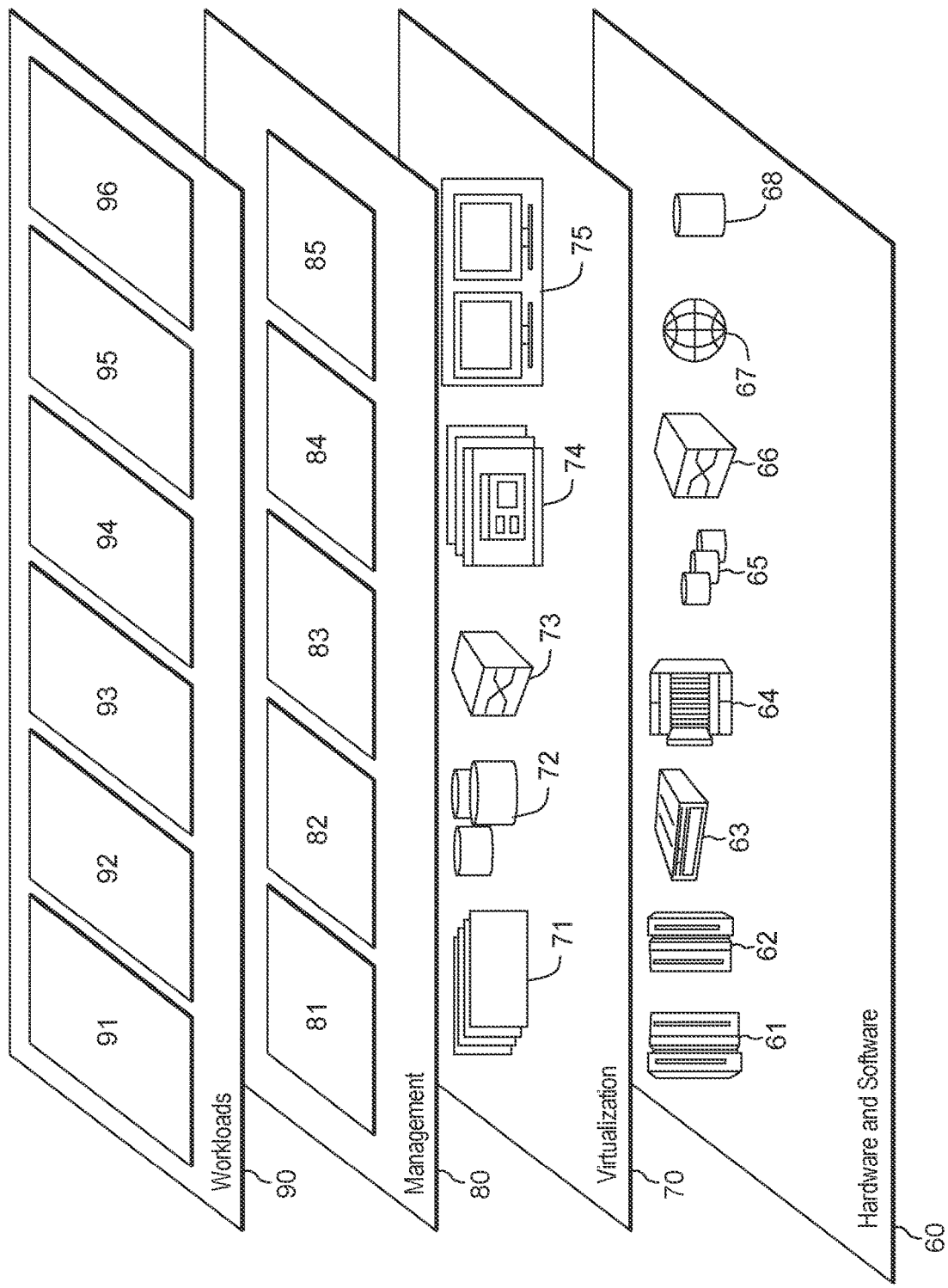
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention. In one embodiment, working memory 1101 (FIG. 1) can be provided by RAM 30 and storage memory 1102 (FIG. 1) can be provided by storage system 34.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, computing node 10 and can include one or more program 40 for performing functions described with reference to computing node 10 as shown in in the flowchart of FIG. 2 and functions described with reference to computing node 10 as shown in the flowchart of FIG. 4 and functions described with reference to the memory map diagrams of FIGS. 5A-5C. In one embodiment, the computing node based systems and devices depicted in FIG. 1 can include one or more program 40 for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for memory management as set forth herein. The processing components 96 can be implemented with use of one or more program 40 described in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   predicting, with use of one or more predictive model, subsequent future state data of a computing node having an associated working memory, wherein the subsequent future state data specifies that a certain transaction currently uninvoked will be invoked by the computing node;
   prior to the invoking of the certain transaction, proactively establishing one or more control parameter value for controlling the working memory in dependence on the future state data;
   invoking the certain transaction in response to receipt, by the computing node, of transaction invoking request data for invoking the certain transaction; and
   executing the certain transaction in dependence on at least one control parameter value of the one or more control parameter value for controlling the working memory.

2. The computer implemented method of claim 1, wherein the method includes establishing a set of working memory control parameter values for control of the working memory in dependence on the future state data.

3. The computer implemented method of claim 1, wherein the method includes logging historical state data of the working memory to define a history repository, and training the one or more predictive model with use of the historical state data.

4. The computer implemented method of claim 1, wherein the at least one control parameter value includes a control parameter value to reserve free memory space of the working memory, and wherein the executing the certain transaction in dependence on at least one control parameter value of the one or more control parameter value includes proactively reserving free memory space within the working memory for storing data of the certain transaction in accordance with the control parameter value to reserve free memory space of the working memory.

5. The computer implemented method of claim 1, wherein the future state data specifies a concurrent transaction that is predicted to be concurrent with the certain transaction, wherein the concurrent transaction has been assigned a priority level in dependence on an expected execution time duration of the concurrent transaction, wherein the method includes determining that a priority level of the concurrent transaction satisfies a low threshold, and wherein the proactively establishing one or more control parameter value for controlling the working memory in dependence on the future state data includes establishing a control parameter value to pause the concurrent transaction based on the determining that the priority level of the concurrent transaction satisfies a low threshold.

6. The computer implemented method of claim 1, wherein the at least one control parameter value includes a control parameter value to clean memory space of the working memory, and a control parameter value to reserve free memory space of the working memory, and wherein the executing the certain transaction in dependence on at least one control parameter value of the one or more control parameter value includes proactively cleaning memory space of the working memory and reserving free memory space within the working memory for storing data of the certain transaction in accordance with the control parameter value to clean memory space of the working memory and the control parameter value to reserve free memory space of the working memory.

7. The computer implemented method of claim 1, wherein the proactively establishing one or more control parameter value for controlling the working memory in dependence on the future state data includes establishing a control parameter value to pause a concurrent transaction.

8. The computer implemented method of claim 1, wherein the proactively establishing one or more control parameter value for controlling the working memory in dependence on the future state data includes establishing a control parameter value to hold the certain transaction so that responsively to invocating the certain transaction, the certain transaction is held in a job queue prior to committing the transaction to the working memory.

9. The computer implemented method of claim 1, wherein the method includes logging historical state data of the working memory into a data repository, training the one or more predictive model by machine learning using the historical state data, and wherein the predicting is performed with use of querying the one or more predictive model.

10. The computer implemented method of claim 1, wherein the method includes ascertaining a priority level of the certain transaction, and wherein the proactively establishing one or more control parameter value for controlling the working memory in dependence on the future state data includes proactively specifying a hold of the certain transaction in dependence on determining that the priority level of the certain transaction satisfies a low threshold.

11. The computer implemented method of claim 1, wherein the method includes ascertaining a priority level of the certain transaction, and wherein the proactively establishing one or more control parameter value for controlling the working memory in dependence on the future state data includes proactively specifying a hold of the certain transaction in dependence on determining that the priority level of the certain transaction satisfies a low threshold, and wherein the ascertaining the priority level of the certain transaction includes using historical execution time duration parameter values of the certain transaction.

12. The computer implemented method of claim 1, wherein the method includes identifying a concurrent transaction predicted to be concurrent with the certain transaction, performing examining of historical state data of the working memory to ascertain a predicted execution time duration of the certain transaction and a predicted execution time duration current transaction, and restricting a hold from being performed with respect to the certain transaction in dependence on the predicted execution time duration of the certain transaction and in dependence on the predicted execution time duration of the concurrent transaction.

13. The computer implemented method of claim 1, wherein the method includes identifying a concurrent transaction predicted to be concurrent with the certain transaction, and restricting a hold from being performed with respect to the certain transaction in dependence on a predicted execution time duration of the certain transaction and in dependence on a predicted execution time duration of the concurrent transaction.

14. The computer implemented method of claim 1, wherein the method includes identifying a concurrent transaction predicted to be concurrent with the certain transaction, and restricting a pause from being performed with respect to the concurrent transaction in dependence on a predicted execution time duration of the certain transaction and in dependence on a predicted execution time duration of the concurrent transaction.

15. The computer implemented method of claim 1, wherein the method includes identifying a concurrent transaction predicted to be concurrent with the certain transaction, and restricting a pause from being performed with respect to the concurrent transaction responsively to determining that a predicted execution time duration of the certain transaction is greater than a predicted execution time duration of the concurrent transaction.

16. The computer implemented method of claim 1, wherein the method includes identifying a concurrent transaction predicted to be concurrent with the certain transaction, and enabling a pause to be performed with respect to the concurrent transaction responsively to determining that a predicted execution time duration of the concurrent transaction is greater than a predicted execution time duration of the certain transaction.

17. The computer implemented method of claim 1, wherein the method includes identifying a concurrent transaction predicted to be concurrent with the certain transaction, wherein the certain transaction is invoked by request data received by a first container based virtual machine running on the computing node, wherein the concurrent transaction is invoked by request data received by a second container based virtual machine running on the computing node.

18. The computer implemented method of claim 1, wherein the method includes identifying a concurrent transaction predicted to be concurrent with the certain transaction, wherein the certain transaction is invoked by request data received by a first container based virtual machine running on the computing node, wherein the concurrent transaction is invoked by request data received by a second container based virtual machine running on the computing node, wherein the method includes restricting a hold from being performed with respect to the certain transaction in dependence on a predicted execution time duration of the certain transaction and in dependence on a predicted execution time duration of the concurrent transaction, wherein the proactively establishing one or more control parameter value for controlling the working memory in dependence on the future state data includes establishing a control parameter value to defragment the working memory and a control parameter value to pause a concurrent transaction.

19. A computer program product comprising:
a computer readable storage medium readable by one or more processing circuit and storing instructions for execution by one or more processor for performing a method comprising:
predicting, with use of one or more predictive model, subsequent future state data of a computing node having an associated working memory, wherein the subsequent future state data specifies that a certain transaction currently uninvoked will be invoked by the computing node;
prior to the invoking of the certain transaction, proactively establishing one or more control parameter value for controlling the working memory in dependence on the future state data;
invoking the certain transaction in response to receipt, by the computing node, of transaction invoking request data for invoking the certain transaction; and
executing the certain transaction in dependence on at least one control parameter value of the one or more control parameter value for controlling the working memory.

20. A system comprising:
a memory;
at least one processor in communication with the memory; and
program instructions executable by one or more processor via the memory to perform a method comprising:
predicting, with use of one or more predictive model, subsequent future state data of a computing node having an associated working memory, wherein the subsequent future state data specifies that a certain transaction currently uninvoked will be invoked by the computing node;
prior to the invoking of the certain transaction, proactively establishing one or more control parameter value for controlling the working memory in dependence on the future state data;
invoking the certain transaction in response to receipt, by the computing node, of transaction invoking request data for invoking the certain transaction; and
executing the certain transaction in dependence on at least one control parameter value of the one or more control parameter value for controlling the working memory.

\* \* \* \* \*